(12) United States Patent
Yang et al.

(10) Patent No.: US 7,675,670 B2
(45) Date of Patent: Mar. 9, 2010

(54) FABRICATION OF A HIGH FILL RATIO SILICON SPATIAL LIGHT MODULATOR

(75) Inventors: Xiao Yang, Cupertino, CA (US); Yuxiang Wang, Palo Alto, CA (US); Wook Ji, San Jose, CA (US); Justin Allen Payne, San Jose, CA (US); Ye Wang, Santa Clara, CA (US); Howard Woo, San Jose, CA (US)

(73) Assignee: Miradia Inc., Santa Clara, CA (US)

( * ) Notice: Subject to any disclaimer, the term of this patent is extended or adjusted under 35 U.S.C. 154(b) by 458 days.

(21) Appl. No.: 11/448,148

(22) Filed: Jun. 5, 2006

(65) Prior Publication Data
US 2007/0097485 A1    May 3, 2007

Related U.S. Application Data

(60) Provisional application No. 60/731,378, filed on Oct. 28, 2005.

(51) Int. Cl.
G02B 26/00 (2006.01)
G02F 1/00 (2006.01)

(52) U.S. Cl. .......... 359/290; 359/295; 359/237

(58) Field of Classification Search ........... 359/290, 359/292, 291, 295, 298
See application file for complete search history.

(56) References Cited

U.S. PATENT DOCUMENTS

| | | | | |
|---|---|---|---|---|
| 5,828,121 A * | 10/1998 | Lur et al. | .......... | 257/522 |
| 5,914,802 A | 6/1999 | Stappaerts et al. | | |
| 6,900,922 B2 | 5/2005 | Aubuchon | | |
| 6,914,711 B2 | 7/2005 | Novotny et al. | | |
| 6,940,096 B2 * | 9/2005 | Ravi | .......... | 257/69 |
| 7,081,928 B2 | 7/2006 | Hubby, Jr. | | |
| 7,139,113 B1 | 11/2006 | Chu et al. | | |

(Continued)

FOREIGN PATENT DOCUMENTS

JP    2004-354440    12/2004

OTHER PUBLICATIONS

International Search Report of PCT Application No. PCT/US06/42045, dated Nov. 19, 2007, 9 pages total.

(Continued)

*Primary Examiner*—Ricky L Mack
*Assistant Examiner*—Brandi N Thomas
(74) *Attorney, Agent, or Firm*—Townsend and Townsend and Crew LLP

(57) ABSTRACT

A method for forming an optical deflection device includes providing a semiconductor substrate comprising an upper surface region and a plurality of drive devices within one or more portions of the semiconductor substrate. The upper surface region includes one or more patterned structure regions and at least one open region to expose a portion of the upper surface region to form a resulting surface region. The method also includes forming a planarizing material overlying the resulting surface region to fill the at least one open region and cause formation of an upper planarized layer using the fill material. The method further includes forming a thickness of silicon material at a temperature of less than 300 ° C. to maintain a state of the planarizing material.

23 Claims, 25 Drawing Sheets

U.S. PATENT DOCUMENTS

| | | |
|---|---|---|
| 7,172,296 B2 | 2/2007 | Huibers |
| 7,184,195 B2 * | 2/2007 | Yang .......................... 359/295 |
| 7,209,274 B2 | 4/2007 | Van Drieenhuizen et al. |
| 7,215,459 B2 | 5/2007 | Huibers et al. |
| 7,245,416 B2 | 7/2007 | Pan et al. |
| 7,262,817 B2 | 8/2007 | Huibers |
| 7,265,477 B2 | 9/2007 | Wan |
| 7,307,777 B2 | 12/2007 | Pan |
| 2005/0128564 A1 | 6/2005 | Pan et al. |
| 2005/0134956 A1 | 6/2005 | Mangrum et al. |
| 2005/0157373 A1 | 7/2005 | Aubuchon |
| 2005/0157375 A1 | 7/2005 | Doan et al. |
| 2005/0179973 A1 | 8/2005 | Nanjyo et al. |
| 2005/0185250 A1 | 8/2005 | Novotny et al. |
| 2005/0206993 A1 | 9/2005 | Doan et al. |
| 2005/0213190 A1 | 9/2005 | Patel et al. |
| 2005/0224449 A1 | 10/2005 | Hsieh et al. |

OTHER PUBLICATIONS

International Search Report of PCT Application No. PCT/US06/042243, dated Nov. 1, 2007, 5 pages total.

International Preliminary Report on Patentability of PCT Application No. PCT/US06/42045, mailed May 8, 2008, 7 pages total.

International Preliminary Report on Patentability of PCT Application No. PCT/US06/042243, mailed May 8, 2008, 7 pages total.

* cited by examiner

FABRICATION OF A HIGH FILL RATIO SILICON SPATIAL LIGHT MODULATOR

CROSS-REFERENCES TO RELATED APPLICATIONS

This application is a non-provisional application of and claims the benefit of U.S. Provisional Application No. 60/731,378, filed on Oct. 28, 2005, which is herein incorporated by reference in its entirety for all purposes.

The following three regular U.S. patent applications (including this one) are being filed concurrently, and the entire disclosure of the other applications are incorporated by reference into this application for all purposes:

application Ser. No. 11/488,149, filed Jun. 6, 2006, entitled "High Fill Ratio Silicon Spatial Light Modulator";
application Ser. No. 11/448,148, filed Jun. 6, 2006, entitled "Fabrication of a High Fill Ratio Silicon Spatial Light Modulator"; and
application Ser. No. 11/448,537, filed Jun. 6, 2006, entitled "Projection Display System including a High Fill Ratio Silicon Spatial Light Modulator.

BACKGROUND OF THE INVENTION

This present invention relates generally to manufacturing objects. More particularly, the invention relates to a method and structure for fabricating a spatial light modulator with a high fill ratio. Merely by way of example, the invention has been applied to the formation of a spatial light modulator having an all silicon mirror, torsion spring hinge, and top electrode. The method and device can be applied to spatial light modulators as well as other devices, for example, micro-electromechanical sensors, detectors, and displays.

Spatial light modulators (SLMs) have numerous applications in the areas of optical information processing, projection displays, video and graphics monitors, televisions, and electrophotographic printing. Reflective SLMs are devices that modulate incident light in a spatial pattern to reflect an image corresponding to an electrical or optical input. The incident light may be modulated in phase, intensity, polarization, or deflection direction. A reflective SLM is typically comprised of an area or two-dimensional array of addressable picture elements (pixels) capable of reflecting incident light.

Some conventional SLMs utilize array designs that include an array of micro-mirrors with a set of electrodes and a memory array positioned underneath each of the micro-mirrors. For display applications, the micro-mirrors are generally fabricated using semiconductor processing techniques to provide devices with dimensions on the order of 15 µm×15 µm. Using such small mirrors enables display applications to use SLMs in applications characterized by increased image resolution for a given display size. Merely by way of example, HDTV systems, with a resolution of 1,080 scan lines×1,920 pixels/line, are currently available to consumers.

One option for increasing the number of micro-mirrors in an array is to add additional micro-mirrors to the array. However, the addition of micro-mirrors of a conventional size increases the silicon real estate used to fabricate the array. Another option is to add additional micro-mirrors while decreasing the size of the individual micro-mirrors, thereby maintaining a generally constant array dimension size. The use of current materials and fabrication processes presents design and manufacturing problems as the mirror size is decreased. Thus, there is a need in the art for a spatial light modulator with an improved architecture including materials and fabrication processes.

SUMMARY OF THE INVENTION

According to the present invention, techniques related to manufacturing objects are provided. More particularly, the invention relates to a method and structure for fabricating a spatial light modulator with a high fill ratio. Merely by way of example, the invention has been applied to the formation of a spatial light modulator having an all silicon mirror, torsion spring hinge, and top electrode. The method and device can be applied to spatial light modulators as well as other devices, for example, micro-electromechanical sensors, detectors, and displays.

According to an embodiment of the present invention, an optical deflection device for a display application is provided. The optical deflection device includes a semiconductor substrate including an upper surface region and one or more electrode devices provided overlying the upper surface region. The optical deflection device also includes a hinge device comprising a silicon material and coupled to the upper surface region and a spacing defined between the upper surface region and the hinge device. The optical deflection device further includes a mirror structure including a post portion coupled to the hinge device and a mirror plate portion coupled to the post portion and overlying the hinge device.

According to another embodiment of the present invention, a spatial light modulator for display applications is provided. The spatial light modulator includes a semiconductor substrate comprising an upper surface region and one or more multi-level electrode devices provided overlying the upper surface region. The one or more multi-level electrode devices include a first level and a second level. The spatial light modulator also includes an insulating layer overlying the first level of the one or more multi-level electrode devices and a hinge device coupled to the insulating layer. The hinge device includes a silicon material and is coplanar with the second level of the one or more multi-level electrode devices. The spatial light modulator further includes a first spacing defined between the semiconductor substrate and the hinge device and a mirror structure comprising a silicon material. The mirror structure overlies a portion of the hinge device and is adapted to move from a first position to a second position. Additionally, the spatial light modulator includes a second spacing defined between the first level of the one or more multi-level electrode devices and the mirror structure and a third spacing defined between the second level of the one or more multi-level electrode devices and the mirror structure.

According to yet another embodiment of the present invention, an array of optical deflection devices for a display application is provided. The array of optical deflection devices includes a semiconductor substrate including a plurality of electrode devices disposed in array form as an array of cells and a bonding region. The array of optical deflection devices also includes a plurality of hinge devices including silicon material. Each of the plurality of hinge devices includes a bonding portion and a deposition interface. The bonding portion of the plurality of hinge devices is bonded to a portion of the bonding region of the semiconductor substrate. The array of optical deflection devices further includes a spacing defined between the plurality of electrode devices and the plurality of hinge devices and a plurality of mirror structures. Each of the plurality of mirror structures includes a post region coupled to the deposition interface of the plurality of hinge devices and a mirror plate overlying a cell of the array of cells of the plurality of electrode devices.

According to an alternative embodiment of the present invention, a micro-mirror for display applications is provided. The micro-mirror includes a semiconductor substrate including an electrode device layer and a bonding region and a hinge device including silicon material bonded to the bonding region of the semiconductor substrate. The hinge device includes a deposition interface opposing the bonding region of the semiconductor substrate. The micro-mirror also includes a mirror post coupled to the deposition interface and extending to a predetermined distance from the semiconductor substrate and a mirror plate coupled to the mirror post and overlying the electrode device layer.

According to another alternative embodiment of the present invention, a multi-layer semiconductor structure for fabricating a spatial light modulator is provided. The multi-layer semiconductor structure includes a semiconductor substrate including a plurality of bias electrode devices and a plurality of activation electrode devices. The multi-layer semiconductor structure also includes an oxide layer coupled to the semiconductor substrate and including a bonding interface extending to a predetermined height from the semiconductor substrate. The oxide layer further includes a first portion extending from a first one of the plurality of activation electrode devices to the bonding interface and a second portion extending from a second one of the plurality of activation electrode devices to the bonding interface thereby forming an oxide free region adjacent one of the plurality of bias electrode devices and between the first portion and the second portion. The multi-layer semiconductor structure further includes a silicon layer bonded to the bonding interface of the oxide layer.

According to a specific embodiment of the present invention, a method for forming an optical deflection device is provided. The method includes providing a semiconductor substrate including an upper surface region and a plurality of drive devices within one or more portions of the semiconductor substrate. The upper surface region includes one or more patterned structure regions and at least one open region to expose a portion of the upper surface region to form a resulting surface region. The method also includes forming a planarizing material overlying the resulting surface region to fill the at least one open region and cause formation of an upper planarized layer using the fill material. The method further includes forming a thickness of silicon material at a temperature of less than 300° C. to maintain a state of the planarizing material.

According to another specific embodiment of the present invention, a method of fabricating an optical deflection device is provided. The method includes providing a substrate, forming a planarized dielectric layer over the substrate, and forming a cavity in the planarized dielectric layer. The method also includes performing a layer transfer process to bond a single crystal silicon layer to the planarized dielectric layer, forming a plurality of vias passing through the single crystal silicon layer and the planarized dielectric layer, and forming a plurality of electrical connections passing through the plurality of vias. The method further includes forming a hinge coupled to the substrate, forming a planarized material layer coupled to the hinge, forming a cavity in the planarized material layer, forming a mirror structure filling at least a portion of the cavity, and releasing the mirror structure.

According to yet another specific embodiment of the present invention, a method for forming a planarized layer is provided. The method includes providing a semiconductor substrate including an upper surface region and a plurality of drive devices within one or more portions of the semiconductor substrate. The upper surface region includes one or more patterned structure regions and at least one open region to expose a portion of the upper surface region to form a resulting surface region. The method also includes dispensing a fill material having a fluid characteristic overlying the resulting surface region to fill the at least one open region and cause formation of an upper planarized layer using the fill material.

According to yet another alternative embodiment of the present invention, a method of forming a composite substrate structure is provided. The method includes providing a substrate comprising a plurality of electrode devices and forming a planarized dielectric layer over the substrate. The planarized dielectric layer defines an upper surface opposing the substrate. The method also includes forming a cavity extending from the upper surface of the planarized dielectric layer to a predetermined depth. The cavity volume is defined by a cavity area parallel to the upper surface of the planarized dielectric layer and the predetermined depth. The method further includes joining a single crystal silicon layer to the upper surface of the planarized dielectric layer to define a bond area greater than the cavity area.

According to a particular embodiment of the present invention, a display system is provided. The display system includes a light source and a first optical system optically coupled to the light source and adapted to provide an illumination beam along an illumination path. The display system also includes a spatial light modulator positioned in the illumination path. The spatial light modulator includes a semiconductor substrate including a plurality of electrode devices and a hinge structure coupled to the semiconductor substrate. The hinge structure includes silicon material. The spatial light modulator also includes a mirror post coupled to the hinge structure and extending to a predetermined distance from the semiconductor substrate and a mirror plate coupled to the mirror post and overlying the plurality of electrode devices. The display system further includes a second optical system optically coupled to the spatial light modulator and adapted to project an image onto a projection surface.

According to another particular embodiment of the present invention, a projection display system is provided. The projection display system includes a light source adapted to provide an illumination beam and a spatial light modulator including a plurality of micro-mirrors controllably deflectable between a first deflection angle and a second deflection angle. Each micro-mirror of the plurality of micro-mirror is associated with a pixel of an image and each micro-mirror includes one or more electrodes provided on a support substrate and a hinge device coupled to the support substrate. The hinge device includes silicon material. Each micro-mirror also includes a mirror post coupled to the hinge device and extending away from the support substrate and a mirror plate coupled to the mirror post and overlying the one or more electrodes. The projection display system also includes illumination optics adapted to direct the illumination beam to the spatial light modulator, optics provided in a projection path lying along the first deflection angle and adapted to project the image on a projection surface, and optics provided in a light dump path lying along the second deflection angle and adapted to reduce an intensity of light propagating along the light dump path.

Numerous benefits are achieved using the present invention over conventional techniques. For example, in an embodiment according to the present invention, a mirror with a hidden hinge and a high fill ratio is provided. Utilizing a single crystal silicon hinge, long-term reliability is provided. Moreover, embodiments of the present invention have an all silicon mirror and hinge structure that can operate at higher temperatures as a result of matching the coefficient of thermal expansion of the mirror and hinge. Additionally, fabrication processes utilized herein are characterized by larger bonding areas and reduced bonding tolerances in comparison to conventional designs. Depending upon the embodiment, one or more of these benefits may exist. These and other benefits have been described throughout the present specification and more particularly below.

Various additional objects, features and advantages of the present invention can be more fully appreciated with reference to the detailed description and accompanying drawings that follow.

DETAILED DESCRIPTION OF SPECIFIC EMBODIMENTS

According to the present invention, techniques related to manufacturing objects are provided. More particularly, the invention relates to a method and structure for fabricating a spatial light modulator with a high fill ratio. Merely by way of example, the invention has been applied to the formation of a spatial light modulator having an all silicon mirror, torsion spring hinge, and top electrode. The method and device can be applied to spatial light modulators as well as other devices, for example, micro-electromechanical sensors, detectors, and displays.

Figure 1A:
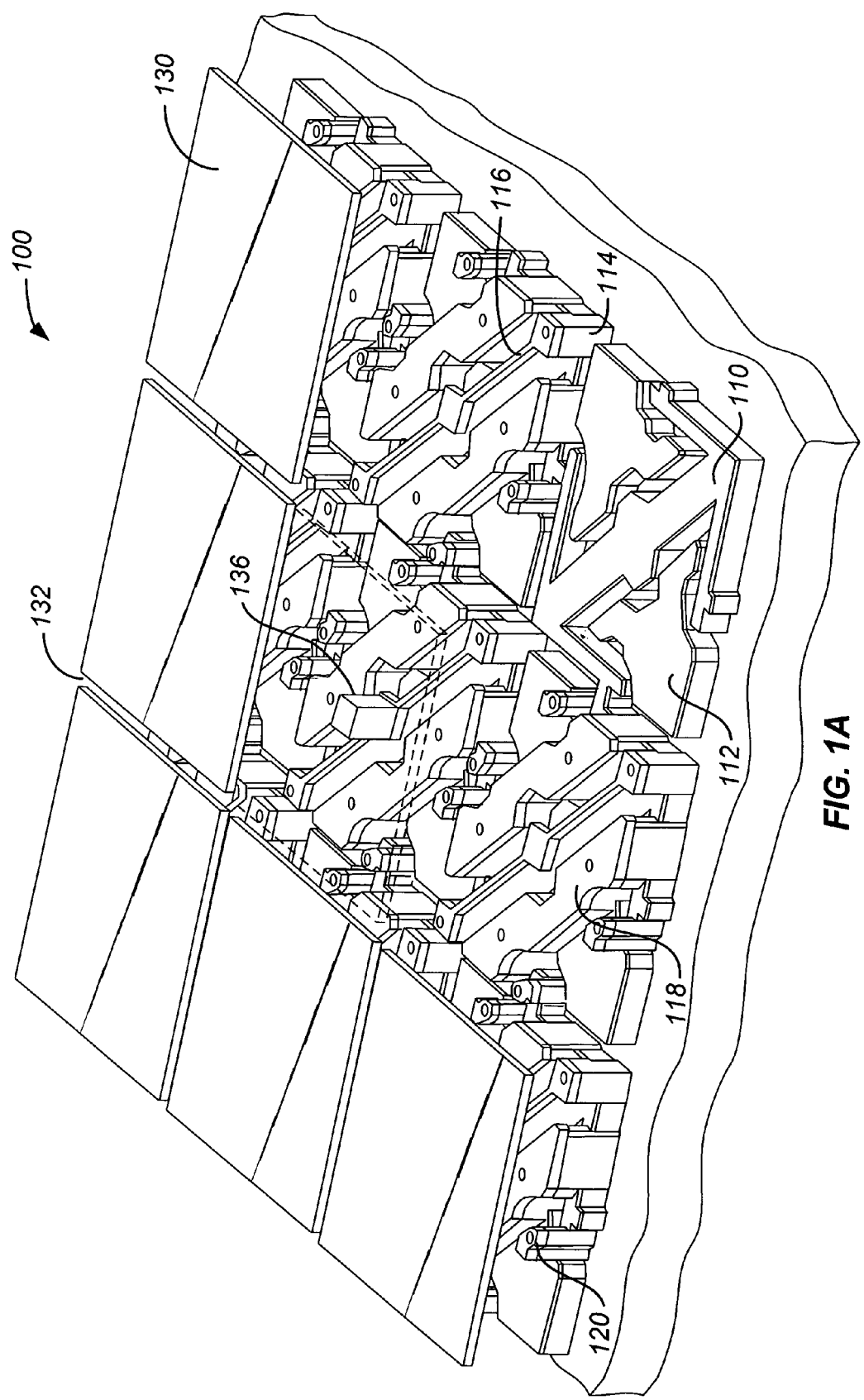
FIG. 1A is a simplified cutaway perspective view of an array of SLMs according to an embodiment of the present invention.

FIG. 1A is a simplified cutaway perspective view of an array of SLMs according to an embodiment of the present invention. As illustrated, this cutaway view is merely representative of the array of SLMs at various stages of processing. As described more fully below, independent control of the SLMs in an array is utilized in embodiments according to the present invention to form images in display applications and other apparatus.

As illustrated in FIG. 1A, the array of SLMs 100 is mounted on a support substrate 105. In some embodiments, the support substrate is a silicon substrate with CMOS control circuitry fabricated using semiconductor processing techniques. Multi-level electrodes 112/118 are coupled to the support substrate 105. As illustrated in FIG. 1A, the multi-level electrodes comprise two complementary electrodes positioned on opposite sides of a flexible member 116 coupled to a standoff structure 114. As described more fully below, in an embodiment, drive voltages are provided to the complementary electrodes, providing electrostatic attraction forces acting on the micro-mirror plates 130.

In operation, the individual reflective elements or pixels 134 making up an array of micro-mirrors in an SLM are selectively deflected, thereby serving to spatially modulate light that is incident on and reflected by the micro-mirrors in the SLM. The spacing 132 between adjacent micro-mirrors is on the order of less than a micron. In a specific embodiment, the spacing 132 is 0.6 µm with micro-mirrors having a pitch of 10.8 µm. In order to deflect the micro-mirrors, a voltage is applied to the complementary electrodes and the mirror plate to cause the mirror to rotate about the torsion spring hinge 116. As will be evident to one of skill in the art, the pixels are adapted to rotate in both clockwise and counter-clockwise directions depending on the particular electrode voltages. When the voltages are removed, the torque present in hinge 116 causes the mirror plate 130 to return to the unactivated position illustrated in FIG. 1A. In the particular embodiment shown in FIG. 1A, landing posts 120 are utilized to arrest the motion of the micro-mirror in the clockwise and counter-clockwise directions.

FIG. 1A illustrates an embodiment of the present invention in which the complementary electrodes are multi-level electrodes 112/118 with raised central portions adjacent the center of the micro-mirror plates. Such multi-level electrodes reduce the distance between the top of the electrode surface and the micro-mirror plates, thereby decreasing the magnitude of the addressing voltages used to actuate the micro-mirror plates. However, embodiments of the present invention are not limited to multi-level electrodes. In alternative embodiments, other electrode geometries are utilized. One of ordinary skill in the art would recognize many variations, modifications, and alternatives.

As illustrated in FIG. 1A, each micro-mirror plate 130 is coupled to the support substrate 105 by mirror post 136, a torsion spring hinge 116, and standoff structure 114. Referring to one of the micro-mirrors 130, upon actuation of the electrodes, the micro-mirror plate rotates in a plane orthogonal to the longitudinal axis of the torsion spring hinge. In some embodiments, the longitudinal axis of the torsion spring hinge is parallel to a diagonal of the micro-mirror plate. The motion of the micro-mirror is arrested by landing structures 120. In order to provide two actuated positions, complementary sets of landing structures are provided on opposite sides of the torsion spring hinge 116. According to embodiments of the present invention, the micro-mirrors are tilted at predetermined angles in the actuated states, providing for controlled reflection of incident radiation. In a particular embodiment, the predetermined angles are about ±15°. In other embodiments, the predetermined angles are less than ±15° or more than ±15°, depending on the particular applications. Moreover, the predetermined tilt angles need not be symmetric, but may be different. One of ordinary skill in the art would recognize many variations, modifications, and alternatives.

Embodiments of the present invention are not limited to the particular architecture described above. In alternative embodiments, a single landing pad located at the landing position of the mirror tip is used in place of the two landing posts. Moreover, two posts positioned at outer edges of the hinge may be used to replace the single standoff structure illustrated. One of ordinary skill in the art would recognize many variations, modifications, and alternatives.

As described more fully throughout the present specification, the support substrate 105, the standoff structures 114, and the torsion spring hinges 116 are joined using a substrate bonding process according to some embodiments of the present invention. In other embodiments, these structures are fabricated using a combination of deposition, patterning, etching, wafer bonding, and other semiconductor processing techniques. In some embodiments, reflective surfaces are formed on the micro-mirror plates 130, providing an array of SLMs with hidden hinges. For purposes of clarity, the spacing between adjacent micro-mirrors is illustrated in FIG. 1A as a significant fraction of the mirror dimensions. As will be evident to one of skill in the art, reductions in the space between mirrors will result in an increased fill ratio and improved image quality in display applications. The spacing between adjacent micro-mirrors is generally defined using photolithographic processes, providing high fill ratio designs. Additional details related to the fabrication of integrated standoff structures and multi-level electrodes are described in U.S. patent application Ser. No. 11/250,320, entitled Spatial Light Modulator With Multi-Layer Landing Structures, filed Oct. 13, 2005, commonly assigned, and hereby incorporated by reference for all purposes.

Figure 1B:
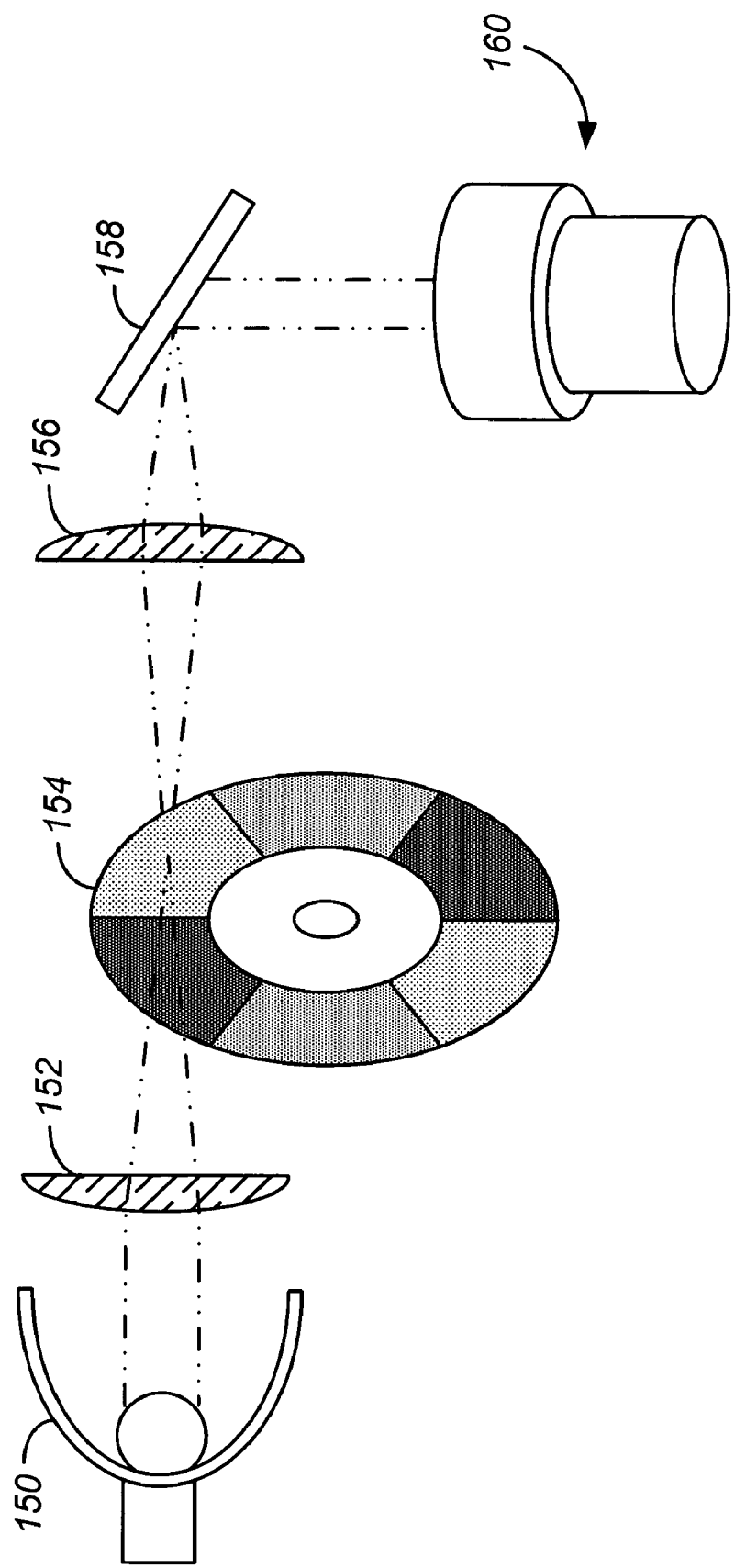
FIG. 1B is a simplified schematic diagram of a display system according to an embodiment of the present invention.

FIG. 1B is a simplified schematic diagram of a display system according to an embodiment of the present invention. As shown in FIG. B, lamp 150 provides an illumination source for the projection display system. Light from lamp 150 is focused using condensing lens 152 prior to passing through color wheel 154. Via rotation of the color wheel, a number of primary colors are provided, for example, red, green, and blue. Although color wheel 154 illustrates the use of three primary colors, embodiments of the present invention are not limited to this number, as additional colors or a white light section may be utilized as well. Moreover, embodiments of the present invention are not limited to the use of lamp/color wheel illumination sources, as multiple sources, including light emitting diodes and lasers may be used in some embodiments. One of ordinary skill in the art would recognize many variations, modifications, and alternatives.

The light passed by the color wheel 154 is focused by shaping lens 156, providing for illumination of spatial light modulator 158. As described more fully throughout the present specification, actuation of individual pixels of the spatial light modulator results in the production of a image that is projected on a display screen (not shown) using projection lens 160.

Figure 2A:
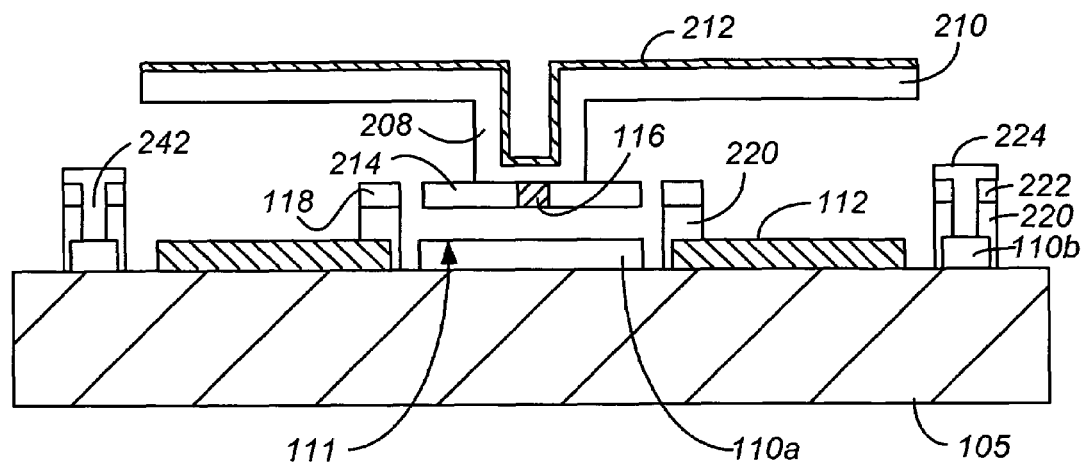
FIGS. 2A-2C illustrate simplified cross-sectional views of a high fill ratio mirror for an SLM according to an embodiment of the present invention.
Figure 2B:
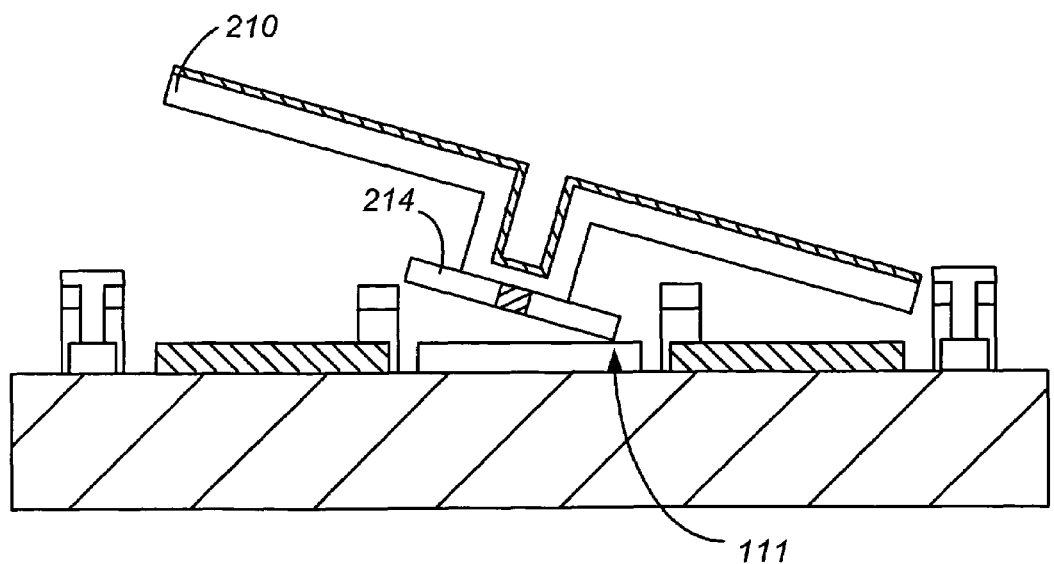
Figure 2C:
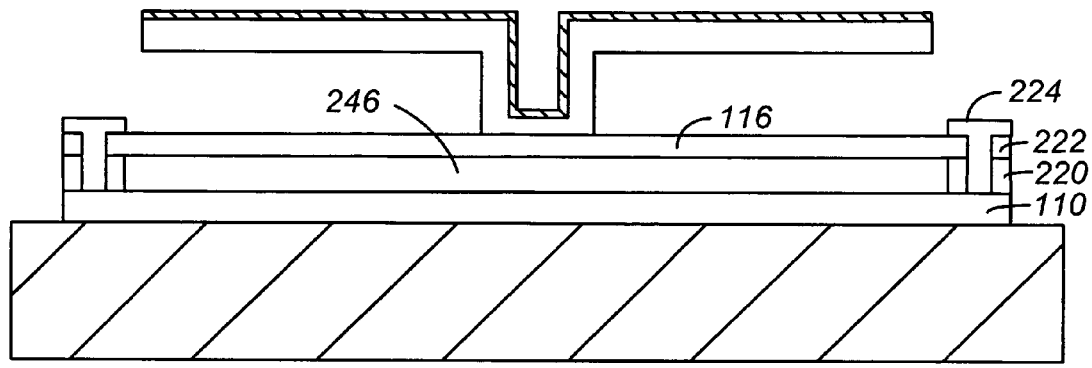

FIGS. 2A-2C illustrate simplified cross-sectional views of a high fill ratio mirror for an SLM according to an embodiment of the present invention. The SLM includes CMOS substrate 105, a bias line 110, a mirror landing area 111 located at a peripheral portion of bias line 110, and a bias grid 110b.

CMOS or device substrate 105 includes a number of layers, of which only a selected few are illustrated in FIGS. 2A-2C. One layer illustrated in the figures includes multi-level or stepped electrodes 112/118. As will be evident to one of skill in the art, additional metal, insulator, and via layers, as well as other devices, are typically fabricated on substrate 105. In some embodiments of the present invention, these additional layers and devices include CMOS circuitry fabricated in processing steps prior to the formation of the electrodes and utilized to drive the electrodes. In a particular embodiment, these layers, along with one or more layers including portions of the electrodes are fabricated using standard CMOS processes.

Referring to FIG. 1A, landing posts 120 are illustrated are replaced in FIG. 2A with the mirror landing areas 111. Other embodiments utilize combinations of these methods or other techniques to arrest the rotation of the micro-mirrors. The SLM also includes bias vias that are filled by a via plug 242 as described more fully below. Bottom electrode 112, which is defined as a portion of a metal-4 (M4) layer is separated from a silicon top electrode 118 by an oxide layer 220. The use of a step electrode design enables the hinge to have an increased length in comparison to single level electrode designs, while still operating at lower voltages.

As shown in FIG. 2A, the via plugs 242 provide electrical connection between the bias grid 110B and a single crystal silicon layer 222 from which a single crystal silicon hinge 116, single crystal silicon landing structure 214, and single crystal silicon top electrode 118 are formed. An antireflection (AR) coating 224 is formed on layer 222 to provide for reduction of undesirable reflections from locations between adjacent micro-mirrors.

The micro-mirror structure includes a mirror post 208 and mirror plate 210. The mirror structure as illustrated in FIG. 2A utilizes an amorphous silicon mirror post 208 and mirror plate 210 and a titanium/aluminum (Ti/Al) reflective layer 212 deposited on the mirror plate 210 using physical vapor deposition (PVD). Thus, in some embodiments, the SLM comprises an all silicon mirror structure, although this is not required by the present invention. The mirror structure 208/210 is attached to the torsion spring hinge 116 during the micro-mirror formation process. As illustrated in FIGS. 1A and 2A, embodiments of the present invention provide a micro-mirror characterized by a high fill ratio and a hidden hinge. Since the central section of the mirror is reflective, high optical quality is provided as well as reduction of undesired reflections from outside the mirror area, resulting in high contrast. The use of a single crystal silicon hinge 116 provides SLMs with long-term reliability and the use of an amorphous silicon mirror plate 210 provides mechanical rigidity.

The mirror plate 210 provides a mechanical structure that resist deformation during operation. For example, an amorphous silicon mirror plate is mechanically rigid as appropriate for a structure that impacts landing structures 120 as illustrated in FIG. 1A during mirror switching operations. As described more fully throughout the present specification, the materials used in the fabrication of mirror post 208 and mirror plate 210 are not limited to amorphous silicon, but a wide variety of materials may be used. Moreover, because both the mirror and hinge structure are fabricated from silicon, the coefficients of thermal expansion (CTE) are well matched, enabling operation of the SLMs at higher operating temperatures.

During conventional operation of the SLM, the mirror is typically switched between a center or unactivated position and two complementary activated positions with equal and opposite deflection angles. In either of the activated positions, stiction forces present between the mirror plate of the micro-mirror and the landing structure, for example, the landing posts 120 illustrated in FIG. 1A, may prevent the micro-mirror from returning to the center position. As will be evident to one of skill in the art, pixels of a display sticking in such an activated state is undesirable. Accordingly, embodiments of the present invention provide torsion spring hinges with increased stiffness to overcome stiction forces and free the micro-mirror from sticking in an activated state. As described below, high stiffness springs also provide for increased operational speed and manufacturability, among other benefits. A single crystalline silicon hinge is well suited for implementing this concept as its Young's modulus is more than twice that of aluminum and its yield stress, more than ten times that of aluminum. The use of a hinge including silicon material also improves performance (by increasing the resonant frequency) and the manufacturability of the device. Additional details related to high stiffness silicon hinges is provided in co-pending and commonly assigned U.S. patent application Ser. No. 11/418,941, filed on May 4, 2006 and entitled "Reflective Spatial Light Modulator With High Stiffness Torsion Spring Hinge," which is incorporated herein by reference in its entirety.

As the array dimensions of the spatial light modulator array is scaled to smaller dimensions, with decreased mirror pitch and increased mirror density, embodiments of the present invention provide benefits not available from conventional designs. Decreases in pixel size generally result in decreases in the longitudinal dimension of the torsion spring hinge, with an increased torsion angle as a function of length. Additionally, as the mirror tilt angle is increased, which contributes to increases in contrast ratio, the torsion spring hinges experience increased stress during mirror activation. If the lateral dimensions of the spring are decreased to reduce the cross-sectional area in response to these increased stresses, material properties of metal, such as aluminum, may be unsuitable for reliable operation over expected lifetimes. Thus, issues presented by the scaling of array dimensions to higher density, such as 1920×1080 pixels in a die of conventional size, provides incentive to utilize embodiments of the present invention in which torsion spring hinges include silicon materials, for example, single crystal silicon.

Various embodiments of the present invention provide one or more of these aforementioned benefits. Moreover, although a single micro-mirror associated with an SLM is illustrated in various embodiments, the present invention is not limited to a single micro-mirror. Arrays of micro-mirrors suitable for display and other applications are provided according to embodiments of the present invention. Furthermore, although several embodiments refer to particular elements of the SLM, additional elements are included within the scope of the present invention. One of ordinary skill in the art would recognize many variations, modifications, and alternatives.

FIG. 2B illustrates a cross-sectional view of an SLM in an activated position according to an embodiment of the present invention. Single crystal silicon landing structure 214 makes contact with mirror landing area 111 to arrest the rotation of the micro-mirror in the activated position. As illustrated in FIG. 2B, peripheral portions of the mirror plate 210 are free from contact with supporting structures while in the activated position. As will be understood, the tapered points of the contact regions reduce stiction forces by thus reducing contact areas.

FIG. 2C illustrates a cross-sectional view of an SLM along an axis perpendicular to that illustrated in FIGS. 2A and 2B. Viewed in a direction perpendicular to the longitudinal axis of the torsion spring hinge 240, a cavity 246 formed between the bias line 110 and the torsion spring hinge 116. Additionally, via plug 242 providing electrical connectivity between bias grid 110 and torsion spring hinge 116 is illustrated. AR coating layer 224 is also illustrated in this cross-sectional view. In some embodiments, the AR coating is optional, whereas in other embodiments, the AR coating serves to reduce reflections of light passing by the edges of the mirror plate.

Figure 2D:
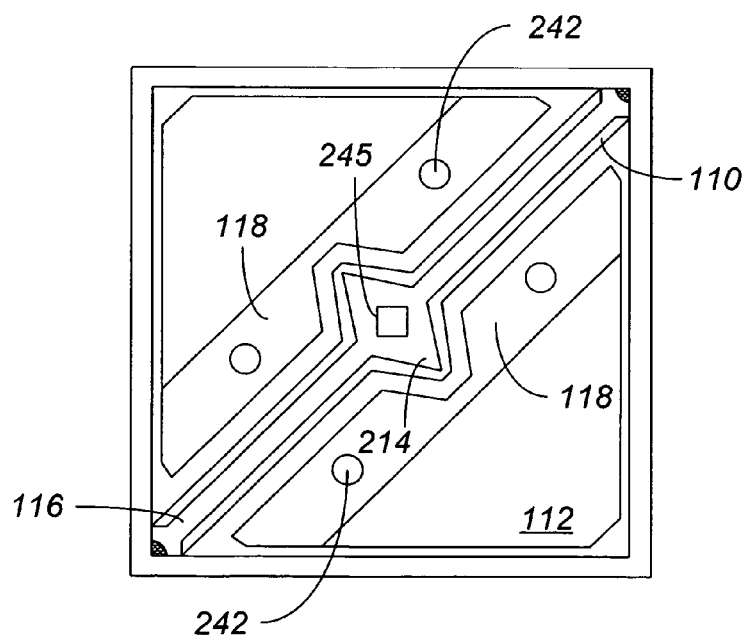
FIG. 2D is a simplified top view of layers of an SLM according to an embodiment of the present invention.

FIG. 2D is a simplified top view of layers of an SLM according to an embodiment of the present invention. In this top view, an overlay of all the layers above M4 is illustrated with the exception of the mirror structure, which is omitted for purposes of clarity. The overlay top view illustrated in FIG. 2D is provided for purposes of comparison, providing a reference for explaining the particular layers of the fabrication process. Bottom electrodes 112 and top electrodes 118 are electrically connected using via plugs 242. Torsion spring hinge 116 has lateral dimensions less than those of bias line 110. Referring to FIGS. 2B and 2D, one of skill in the art will appreciate that the contact region of single crystal silicon landing structure 214 is characterized by a particular geometry. As illustrated in FIG. 2D, the silicon landing structure 214 is shaped generally as a diamond with tapered points, thereby reducing the contact area between the landing structure and the bias line 110 and associated stiction forces. Other geometries are utilized in other embodiments, as will be evident to one of skill in the art. The mirror post 245 is illustrated as a square feature in FIG. 2D supporting the mirror structure (not shown) above the torsion spring hinge 116 and the electrodes 112 and 118.

Figure 3A:
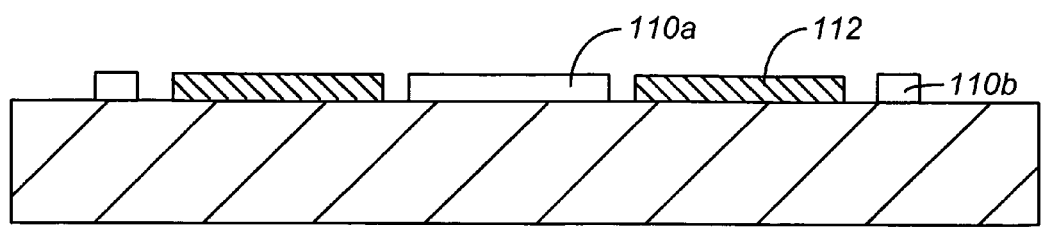
FIGS. 3A-3L illustrate simplified cross-sectional views of a process flow for fabricating an SLM according to an embodiment of the present invention.

FIGS. 3A-3L illustrate simplified cross-sectional views of a process flow for fabricating an SLM according to an embodiment of the present invention. Referring to FIG. 3A, CMOS wafer 105 is illustrated after a via formation process. Bottom electrode layer 112 is formed using a low temperature (e.g., less than 350° C.) PVD metal deposition process. Generally, the bottom electrode layer 112 includes a multi-layer metal stack such as 1,000 Å of titanium nitride (TiN), 8,000 Å of aluminum, and another 1,000 Å of TiN. Of course, in alternative embodiments, other suitable materials that conduct electricity and provide mechanical support for additional layers are utilized to form the bottom electrode layer 112. Patterning using photolithography and etching processes are utilized to pattern the bottom electrode layer 112 after deposition. The bias line 110a and the bias grid 110b are also formed during this PVD metal deposition process.

Thus, as shown in the top view illustrated in FIG. 4A below, although various metal layers defined during the process steps illustrated in FIG. 3A lie in the same vertical plane, they are physically separated so as to operate at different potentials. As described more fully below, various layers are formed during fabrication processes to form the overall electrode and mirror structure. The various materials and processes described below are not intended to limit the scope of the present invention but are merely provided as illustrative examples. One of ordinary skill in the art would recognize many variations, modifications, and alternatives.

Figure 3B:
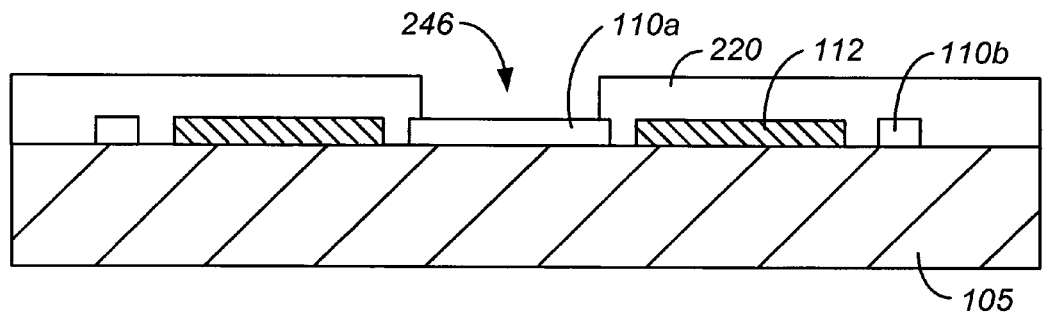

Referring to FIG. 3B, a high density plasma (HDP) insulator deposition, planarization, and patterning process is illustrated. In some embodiments, planarization is accomplished using a chemical mechanical polishing (CMP) process, although this is not required by the present invention. In the embodiment illustrated in FIG. 3B, the layer 220 is an oxide layer deposited using a low temperature (e.g., less than 350° C.) HDP process, although other layers that provide electrical insulation and mechanical support for additional layers are utilized in alternative embodiments. Bias line 110a and bias grid 110b are illustrated as before and are covered by the oxide layer during the deposition process and prior to the patterning process.

In an embodiment, layer 220 is fabricated from silicon oxide ($Si_xO_y$), but this is not required by the present invention. Other suitable materials may be used within the scope of the present invention. For example, layers fabricated from silicon nitride ($Si_xN_y$) are utilized in alternative embodiments. In yet other embodiments, silicon oxynitride (SiON) is used to fabricate layer 220. Moreover, polysilicon material, including amorphous polysilicon, is utilized in yet another alternative embodiment according to the present invention. Combinations of such materials may be used to form a composite layer. Materials with suitable characteristics, including formation of a strong bond with underlying layers, good adhesion to substrate 105, and mechanical rigidity, are acceptable substitutes for $Si_xO_y$ materials.

Moreover, in some embodiments of the present invention, the process used to deposit the layer or layers from which layer 220 is fabricated is performed in light of the structures associated with the device substrate. For example, some CMOS circuitry may be adversely impacted by performing high temperature deposition processes, as these high temperature deposition processes may damage metals (e.g., aluminum reflow) or result in diffusion of junctions associated with the CMOS circuitry. Thus, in a particular embodiment of the present invention, low temperature deposition, patterning, and etching processes, such as processes performed at temperatures of less than 500° C., are used to form layer 220. In another specific embodiment, deposition, patterning, and etching processes performed at less than 400° C., are used to form layer 220.

In a particular embodiment, layer 220, with a first thickness, is deposited on substrate 105. Layer 220 is a silicon dioxide ($SiO_2$) layer in a specific embodiment of the present invention, but as described above, this is not required by the present invention. Other suitable materials may be used within the scope of the present invention. For example, layer 220 is formed by deposition of silicon nitride ($Si_3N_4$), silicon oxynitride (SiON), combinations thereof, and the like in alternative embodiments. Moreover, polysilicon material, including amorphous polysilicon, is deposited to form layer 220 in yet another alternative embodiment according to the present invention.

The deposited layer 220 has a predetermined first thickness as initially deposited. In a specific embodiment, the first thickness is about 2 μm. In other embodiments, the first thickness ranges from about 1.0 μm to about 3.0 μm. Of course, the thickness will depend on the particular applications. In some deposition processes, the upper surface of the deposited layer 220 is uniform across the substrate, resulting in a planar surface. However, a planar surface after deposition is not required by the present invention. In a particular deposition process, the patterned nature of the bias layer 110 and electrodes 112 results in the thickness of layer 220 varying as a function of lateral position, producing an upper surface that is not entirely flat.

Figure 3C:
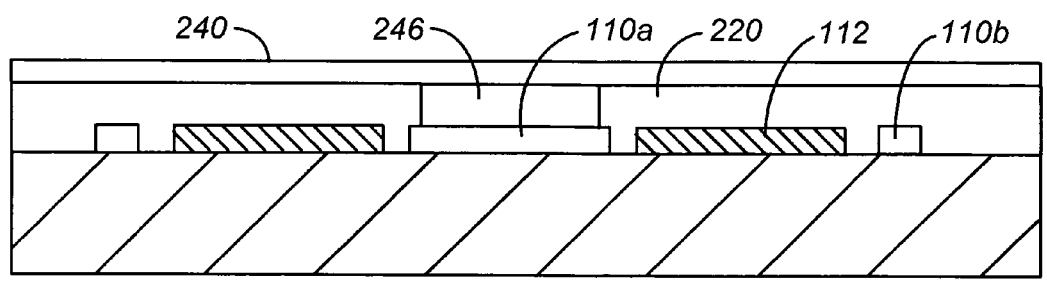

To planarize the upper surface of the deposited layer 220, an optional CMP step is performed in an embodiment of the present invention. The results produced by the CMP process are illustrated by the upper surface of layer 220 as shown in FIG. 3B in which the thickness of layer 220 is a second thickness less than the first thickness. During the CMP process, material is removed, resulting in a highly polished and planaraized layer of a second thickness. In a particular embodiment, the root-mean-square (RMS) roughness of the planarized surface is less than or equal to about 4 Å. As will be described below, the extremely smooth surface produced during the CMP process facilitates substrate bonding as shown in FIG. 3C. In embodiments according to the present invention, the second thickness of layer 220 is about 0.8 μm. Alternatively, the second thickness ranges from about 0.5 μm to about 2.5 μm in other embodiments. Of course, the thickness will depend upon the particular applications.

Referring to FIG. 3C, cavity 246 is formed in layer 220 using a patterning and material removal process, such as etching. The cavity 246 extends from the upper surface of deposited layer 220 to the bias line 110a. The dimensions of the cavity are selected to provide a rotation space for the torsion spring hinge as described more fully below. The cavity 246 is characterized by a volume defined by the depth of the cavity, measured normal to the upper surface of layer 220 and the lateral area of the cavity. According to embodiments of the present invention, the surface area defined by the upper surface of layer 220 is greater than the lateral area of the cavity 246. The greater surface area provided by the upper surface of layer 220 compared to the lateral area of the cavity facilitates substrate bonding as discussed in relation to FIG. 3C since the bonding area is greater than the unbonded area. In a specific embodiment, the lateral area of the cavity has a width and a length of about 1 μm on a pitch of about 10 μm. Thus, the lateral area of the cavity is about 15% of the total original surface area of the upper surface of layer 220 prior to formation of cavity 246 and the bonding area extends over about 85% of the surface area of layer 240. The bonding yield, which is related to the bonding area, is high in embodiments of the present invention as a result of these area ratios.

FIG. 3C illustrates a simplified cross sectional view of the SLM after a substrate bonding process. According to an embodiment, a silicon on insulator (SOI) substrate including single crystal silicon layer 240 is bonded to the substrate illustrated in FIG. 3B using substrate bonding techniques. After the substrates are joined, the insulating and other layers (not shown) of the SOI substrate are removed using lapping, grinding, etching, or other thinning processes, to expose the single crystal silicon layer 240. Additional information related to the substrate bonding process is provided in U.S. patent application Ser. No. 11/028,946, filed on Jan. 3, 2005 and entitled "Method and Structure for Forming an Integrated Spatial Light Modulator," which is commonly assigned and is herein incorporated by reference for all purposes.

Substrate bonding can occur using a variety of techniques. In a specific embodiment, the bonding occurs using a room temperature covalent bonding process that results in the formation of a chemical bond at the bonding interface. Such low temperature bonding processes maintain the structural and electrical integrity of the CMOS semiconductor substrate 105. Each of the faces is cleaned and activated, e.g., by plasma activation or by wet processing. The activated surfaces are brought in contact with each other to cause a sticking action. In some bonding processes, mechanical force is provided on each substrate structure to press the faces together. In embodiments in which layer 240 is silicon and layer 220 is silicon oxide, silicon bearing bonds are created between the two faces. In alternative embodiments, an oxide layer is formed on the upper surface of layer 220 prior to bonding to provide an oxide-oxide bond interface. The upper surface of layer 220 is polished by a CMP process in one embodiment while the bonding surface of layer 240 is polished as well, providing an extremely smooth surface that is conducive to covalent bonding processes. According to embodiments of the present invention, no intermediate bonding material (e.g., epoxy) is utilized during the substrate bonding process. Of course, one of ordinary skill in the art would recognize many other variations, modifications, and alternatives.

According to embodiments of the present invention, bonding techniques are utilized that provide interfaces characterized by a bonded area/total area ratio of greater than 10%. For example, the bonded area, characterized by an adhesion test, is greater than 10% of the surface area of the upper surface of layer 220. In other embodiments, the bonded area/total area ratio is greater than 50%. In yet other embodiments, the bonded area/total area ratio is greater than 80%. The increase in bonded area as a function of the total interface area will result in a stronger mechanical connection between the torsion spring hinge layer and the support structures coupled to the substrate.

A cavity 246 is formed in between the two substrates during the bonding process. As described more fully throughout the present specification, the cavity 246, which was formed using a lithography and etching process during the process illustrated in FIG. 3B, provides space for rotation of the torsion spring hinge 116 and single crystal landing structure 214.

According to some embodiments, a thin SOI substrate is used with a direct implant process used during a portion of the substrate bonding and thinning process. In some embodiments, no epitaxial process is used, providing lower cost and better uniformity for the single crystal silicon layer. Moreover, reductions in bonding alignment tolerances as well as better mirror to electrode alignment are provided according to embodiments of the present invention. In particular, because the SOI substrate including single crystal silicon layer 240 is planar and does not include surface features that are aligned with particular surface features present on the substrate 105, bonding alignment tolerances are reduced. Furthermore, embodiments of the present invention provide a large bonding area defined by the upper surface of the oxide layer 220, resulting in higher yield than conventional processes.

As an optional process in fabricating device according to embodiments of the present invention, a conductive layer (not shown) is formed in contact with the upper surface of single crystal silicon layer 240, providing for electrical conductivity between the layer 240 and subsequently deposited layers described more fully below. In an embodiment, the conductive layer is a deposited layer fabricated using the same materials utilized to form via plugs 243 described below. Thus, the conductive layer provides electrical conductivity between the via plugs and the mirror structure described more fully below.

Figure 3D:
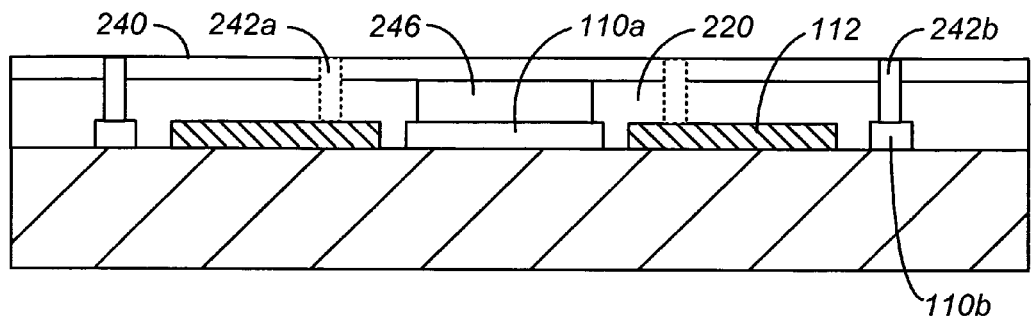

FIG. 3D illustrates a via etch process according to an embodiment of the present invention. As shown in FIG. 3D, vias 242a and 242b are etched to provide a path for electrical contact between various layers of the structure. For example, via 242a is a via providing an electrical connection between bottom electrode 112 and a silicon top electrode (not shown) that is fabricated in subsequent processing steps. Additionally, a bias via 242b is etched to make a contact path to the bias grid 110b. Additional description of the geometry and placement of the vias is provided below. Generally a two-step etch process is utilized to etch through the silicon layer 240 and the oxide layer 220, terminating on the upper surface of the metal-4 layer forming the bottom electrode 112 and the bias grid 110b.

Figure 3E:
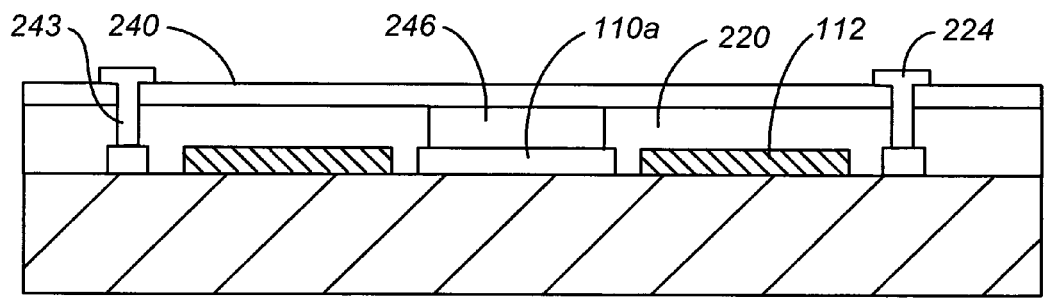

FIG. 3E illustrates the formation and patterning of via plugs 243 as well as an AR coating 224 according to an embodiment of the present invention. Vias formed during the process illustrated in FIG. 3D are filled using a via plug formation process that provides electrical connectivity between the bias layer 110a and the single crystal silicon layer 240. In some alternative embodiments of the present invention, a low temperature (less than 350° C.) chemical vapor deposition (CVD) process is utilized to deposit a conformal titanium layer that provides via step coverage and electrically connects the upper surface of the single crystal silicon layer 240 and the bias layer 110. In this alternative embodiment, the formation of the AR contact layer discussed below is modified, forming via plugs of dielectric material on the CVD Ti layer. One of ordinary skill in the art would recognize many variations, modifications, and alternatives.

AR coatings 224 are formed on portions of the structure, reducing the reflection of light passing by the sides of the micro-mirrors. Generally, the formation of AR coatings includes the deposition and patterning of dielectric layers of predetermined index of refraction and thickness. In some embodiments, the AR coating process is optional. One of ordinary skill in the art would recognize many variations, modifications, and alternatives.

Figure 3F:
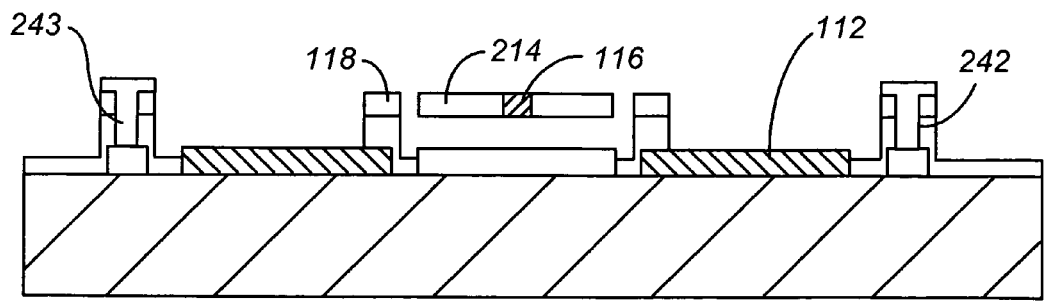

FIG. 3F illustrates the definition of the hinge and the patterning of the step electrode. Single crystal silicon hinge 116 and landing structure 214 are masked using a lithography process and etched using a silicon etching process. According to embodiments of the present invention, the fabrication of the hinge from single crystal silicon provides numerous benefits, including high reliability. In embodiments in which the conformal CVD Ti layer is deposited in vias 242, a metal etch precedes the silicon etch process. Referring to FIG. 3F, in regions above the bottom electrode 112, both the single crystal silicon layer 240 and the HDP oxide 220 are removed, exposing the bottom electrode 112. As will be understood, an etch process is terminated using the metal-4 layer as an endpoint is utilized in some embodiments. Of course, other removal processes are included within the scope of the present invention. As illustrated in FIG. 3F, in some embodiments, both the hinge and a top portion 118 of the stepped electrode are fabricated from silicon, for example, single crystal silicon layer 240.

In a particular embodiment of the present invention, the hinge definition and the patterning of the step electrodes are separated into two lithography/etch processes. A hinge definition etch includes patterning using deep-ultraviolet (DUV) lithography that provides critical dimensions of about 0.18 μm while the step electrode etch includes patterning using i-line lithography that provides critical dimensions of about 0.6 μm. Thus, although illustrated as a single process in FIG. 3F, multiple lithography and etching steps characterized by different resolutions are utilized in some embodiments to reduce processing costs while providing desired uniformity and control.

Figure 3G:
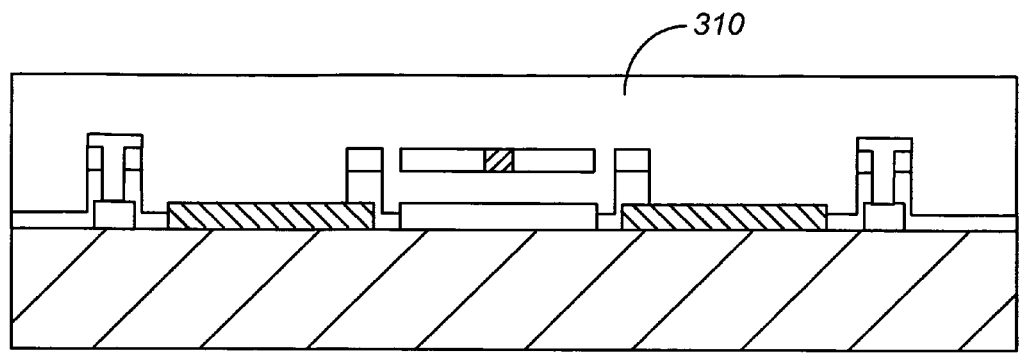

FIG. 3G illustrates the formation of a sacrificial layer 310 on the SLM substrate. The material used for layer 310 is sacrificial in the sense that it provides mechanical support for subsequently deposited and patterned layers and is then removed in other subsequent processing steps. In some embodiments, the material used to form sacrificial layer 310 is photoresist, although this is not required by the present invention. Planarization of the sacrificial layer is performed in some embodiments. Preferably, the planarized surface of layer 310 is characterized by a waviness, defined as a peak to valley roughness, of less than 50 nm. As discussed more fully below, planarization of the upper surface of layer 310 enables the formation of a planar mirror plate in subsequent processing steps. In one embodiment, photoresist material is spun on substrate 105 with a first thickness. Partial exposure of the photoresist material using an exposure dose less than that needed to fully expose the photoresist material is performed. Accordingly, development of the partially exposed photoresist results in removal of an upper portion of the photoresist material, producing a sacrificial layer of a second thickness as illustrated in FIG. 3G. As illustrated in FIG. 3G, the sacrificial material coats and embeds the various components fabricated in previous processing steps.

Figure 3H:
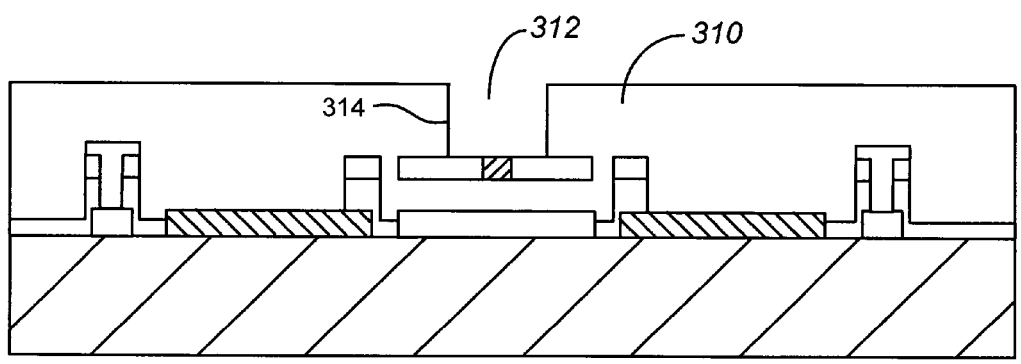

FIG. 3H illustrates the formation of a mirror post cavity adjacent to the torsion spring hinge according to an embodiment of the present invention. A volume 312 is opened up in the sacrificial material 310 with the volume 312 vertically adjacent to the hinge. The geometry of the volume 312 is a predefined shape, providing a footprint for a mirror post that provides mechanical contact between the hinge and the mirror plate, described below. In the embodiment illustrated in FIG. 3H, the top view of the volume 312 is a square. Generally, the tolerances for the definition of area 312 are such that and i-line lithography process is utilized with a critical dimension of about 1.0 µm. As illustrated in FIG. 3H, the side-walls 314 of the volume 312 are perpendicular to layer 240 from which the torsion spring hinge is fabricated. However, this is not required by the present invention. In some embodiments, the side-walls 314 are tilted at an angle to the vertical, enabling for step coverage of the side-walls during a PVD silicon deposition process described more fully below. One of ordinary skill in the art would recognize many variations, modifications, and alternatives.

Figure 3I:
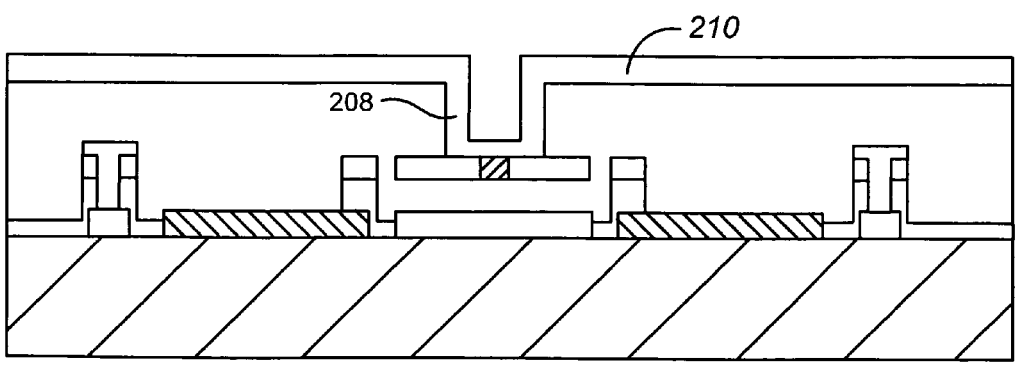

FIG. 3I illustrates the formation of a mirror structure including a mirror post 208 and a mirror plate 210 in contact with the hinge and the sacrificial material according to an embodiment of the present invention. In the embodiment illustrated in FIG. 3I, the layer from which the mirror post and the mirror plate are formed is deposited using an amorphous silicon deposition process, for example, a physical vapor deposition (PVD) process. In a particular embodiment, the PVD process is performed at a temperature of less than 300° C., although in other embodiments, the formation temperature is lower, for example, less than 200° C. or less than 100° C. As illustrated in FIG. 3I, the layer from which the mirror post and the mirror plate are formed is a conformal layer, although this is not required by the present invention. As discussed above, the cross-sectional profile of the mirror post is generally tapered to provide for step coverage that includes the side-walls of the mirror post. According to embodiments of the present invention, the single crystal silicon hinge material is joined to the amorphous silicon mirror post at the anchor position opened up by the process illustrated in FIG. 3H. Because the hinge and mirror structure are both silicon, the CTE of these materials is well matched, providing thermal benefits over conventional designs.

In some embodiments, an adhesion layer, such as a titanium layer, is formed on the upper surface of layer 240 after opening of cavity 312 and prior to formation of the mirror post 208. In these embodiments, the adhesion layer promotes the mechanical integrity of the mechanical bond formed between the hinge and the mirror post. One of ordinary skill in the art would recognize many variations, modifications, and alternatives.

Figure 3J:
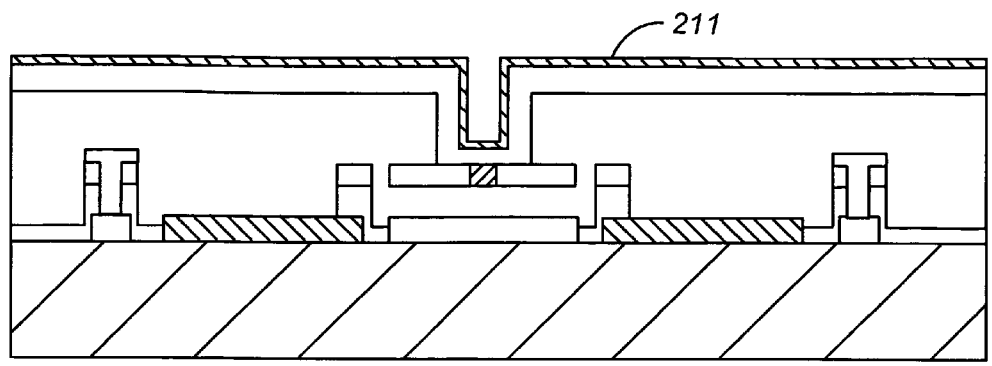

FIG. 3J illustrates the formation of a reflective layer on the mirror plate according to an embodiment of the present invention. In the embodiment illustrated in FIG. 3J, the reflective layer 211 is formed using a PVD process in which a Ti seed layer and an Al layer are deposited on the mirror plate layer. Preferably, the PVD process is performed a temperature of less than 100° C. In alternative embodiments, other reflective layers that adhere to the mirror layer are utilized. In some embodiments, the top surface of the mirror plate is polished to provide a reflective surface. In a particular embodiment, the top surface of the mirror plate is characterized by a surface roughness less than or equal to about 25 Å RMS. One of ordinary skill in the art would recognize many variations, modifications, and alternatives.

Figure 3K:
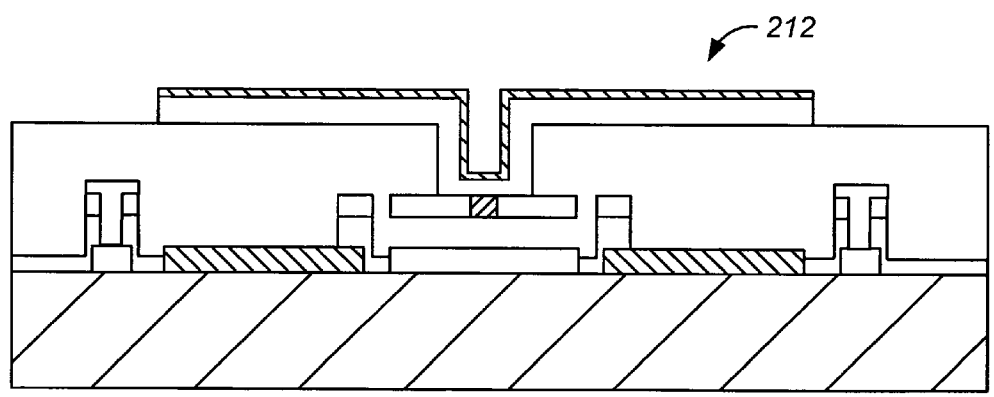
Figure 3L:
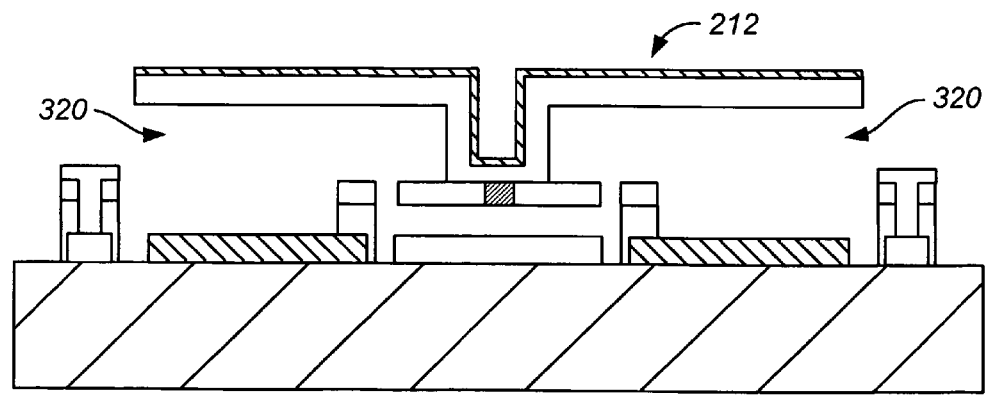

FIG. 3K illustrates a mirror patterning process according to an embodiment of the present invention. A lithography and etching process is utilized to selectively remove the Ti/Al layer 211 and the amorphous silicon layer 210 to form mirror 212. In one embodiment, the dimensions of the mirror are 15 µm×15 µm, whereas in another embodiment the dimensions of the mirror are 9.6 µm by 9.6 µm. In other embodiments, other dimensions are utilized as appropriate to the particular applications. FIG. 3L illustrates a process step in which the sacrificial material is removed, freeing the mirror plate to rotate about the torsion spring hinge. In regions 320, the sacrificial material is removed, releasing the mirror. In some embodiments in which the sacrificial material is photoresist, a plasma ashing process is used to remove the photoresist, exposing the mirror and freeing the mirror to rotate under the influence of the electrodes and bias voltages.

According to embodiments of the present invention, SLMs are provided with mirrors in which the whole structure of mirror is silicon, or composites of silicon and other materials, not aluminum. The use of an all silicon mirror structure provides benefits including mirror structures with high mechanical strength, a high degree of flatness, and mechanical rigidity. Additionally, embodiments of the present invention use different forms of silicon for different parts of the mirror and hinge structure. In a specific embodiment, for example, the hinge is fabricated from single crystal silicon as a result of the mechanical properties of single crystal silicon. In this specific embodiment, the mirror plate is fabricated from amorphous silicon so that the mirror plate does not flex significantly since amorphous silicon is strong, flat, and rigid. Additionally, in this specific embodiment, the CTE of the mirror structure and the hinge are well matched.

As described more fully throughout the present specification, the materials used in the fabrication of mirror post 208 and mirror plate 210 are not limited to amorphous silicon, but a wide variety of materials may be used. Other suitable materials for the mirror post and the mirror plate include polysilicon, silicon metal alloys (e.g., silicon/aluminum), metal, (e.g., tungsten, titanium, titanium nitride), combinations of these materials, and the like.

The process flow illustrated in FIGS. 3A-3L provides a baseline design for the fabrication of an SLM. Alternative embodiments modify and change portions of the baseline design while still providing SLMs and micro-mirrors within the scope of the present invention. The process flow discussed above is merely an exemplary process for fabricating an SLM and is not intended to limit embodiments of the present invention. In alternative embodiments, the number of steps, the order of the steps, and the lengths of the various steps are modified depending on the particular application. Other alternatives can also be provided where steps are added, one or more steps are removed, or one or more steps are provided in a different sequence without departing from the scope of the claims herein. Further details of suitable process flows can be found throughout the present specification and more particularly below.

In a particular embodiment of the present invention, a method of fabricating an optical deflection device is provided. The method includes providing a substrate, for example, a CMOS substrate including a number of electrode devices. Additionally, the substrate may include a number of electrode drivers, a pulse width modulation array, and other suitable electronic circuitry associated with the electrode devices. In an embodiment, the electrode devices are disposed to form a multi-dimensional array pattern associated with pixels of the optical deflection device. The method also includes forming a planarized dielectric layer over the substrate. In a specific embodiment, forming the planarized dielectric layer includes depositing an oxide layer using an HDP process and planarizing the deposited oxide layer using a CMP process. One of ordinary skill in the art would recognize many variations, modifications, and alternatives.

In some embodiments, the process of depositing an oxide layer is performed at a temperature less than a temperature associated with a state change of an underlying material, such as the CMOS circuitry, for example the electrode devices. The temperature of the oxide deposition process is preferably less than an aluminum reflow temperature, which is about 450° C. In another embodiment, the process of depositing an oxide layer is performed at a temperature less than a temperature less than a glass transition temperature of photoresist, which is about 150° C.

The method further includes forming a cavity in the planarized dielectric layer. In some embodiments, the cavity is formed by an etching process that removes a predetermined amount of the planarized dielectric layer. The cavity provides a rotation space for a torsion spring hinge and optional landing structures fabricated in subsequent processing steps. A layer transfer process is performed to bond a single crystal silicon layer to the planarized dielectric layer. The layer transfer process generally includes a substrate bonding process that provides a covalent bond between the planarized dielectric layer and the single crystal silicon layer. In particular embodiments, the substrate bonding process utilizes an SOI substrate, various layers of which are removed to provide the single crystal silicon layer.

The method additionally includes forming a plurality of vias passing through the single crystal silicon layer and the planarized dielectric layer and forming a plurality of electrical connections passing through the plurality of vias. In some embodiments, the plurality of vias include a first set of vias providing an electrical conduction path to a bias line and a second set of vias providing an electrical conduction path to a bias grid. Generally, the plurality of electrical connections utilize via plugs formed using conventional via plug formation processes, such as a tungsten plug process. In other embodiments, the plurality of electrical connections utilizes a conformal metal layer that is deposited in or on the inner walls of the vias. In a specific embodiment, the conformal metal layer is a composite Ti/Al layer.

Moreover, the method includes forming a hinge coupled to the substrate. A photolithography patterning and etching process is used to form the hinge in some embodiments. A planarized material layer coupled to the hinge is formed out of photoresist in some embodiments and a cavity is formed in the planarized material layer. The cross-sectional profile of the cavity is generally tapered, with a larger area at the top of the cavity than at the bottom of the cavity. Utilizing such a tapered cavity, PVD processes provide a layer of continuous material in subsequent deposition processes. A mirror structure including a mirror post and a mirror plate is formed by filling at filling at least a portion of the cavity. The mirror structure is released by removing the planarized material layer, generally using an oxygen plasma ashing process to remove the photoresist layer.

According to some embodiments, the mirror structure is formed using silicon materials or composites of silicon and other materials. In particular, an amorphous silicon layer is deposited and planarized at a temperature of less than 150° C. to form the mirror post and the mirror plate. In other embodiments, the mirror structure is fabricated using polysilicon, silicon/metal alloys such as silicon/Al alloys, combinations of these materials, and the like. As an optional fabrication process, a mirror coating layer, for example, a Ti/Al layer, coupled to the mirror structure is formed to increase the reflectivity of the mirror structure, which is desirable for display applications.

Figure 4A:
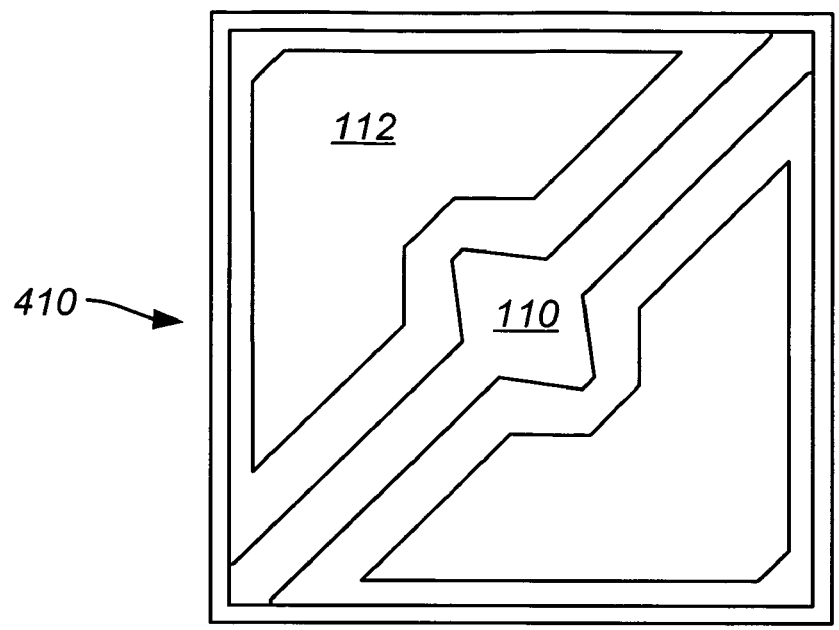
FIGS. 4A-4F are simplified top views of several layers of an SLM fabricated using the process flow illustrated in FIGS. 3A-3L.
Figure 4B:
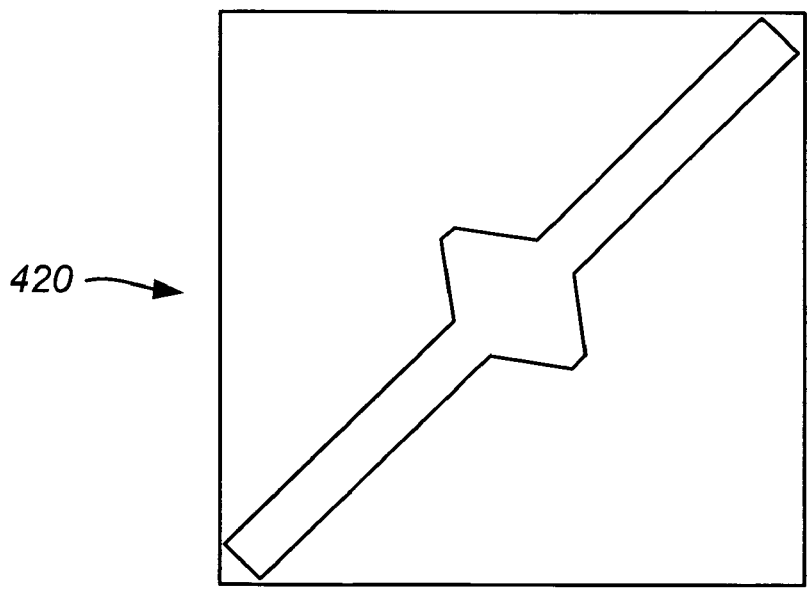

FIGS. 4A-4F are simplified top views of several layers of an SLM fabricated using the process flow illustrated in FIGS. 3A-3L. Referring to FIG. 4A, bottom electrode 112 and bias layer 110 are illustrated as mask layer 410. The lateral spacing between the bottom electrodes and the bias layer provides for electrical isolation between these layers. FIG. 4B illustrates the mask pattern 420 used to open up portions of the oxide layer 220 at a position vertically adjacent a portion of the bias line 110 as illustrated in FIG. 3B. As described more fully throughout the present specification, the area opened and illustrated in the top view illustrated in FIG. 4B provides a bias source and a landing area for the mirror landing structure.

Figure 4C:
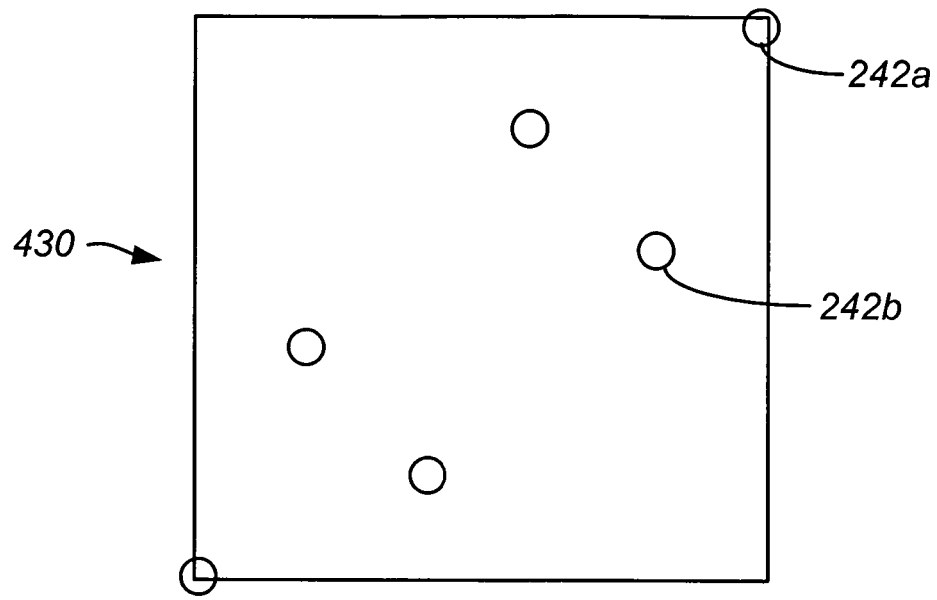
Figure 4D:
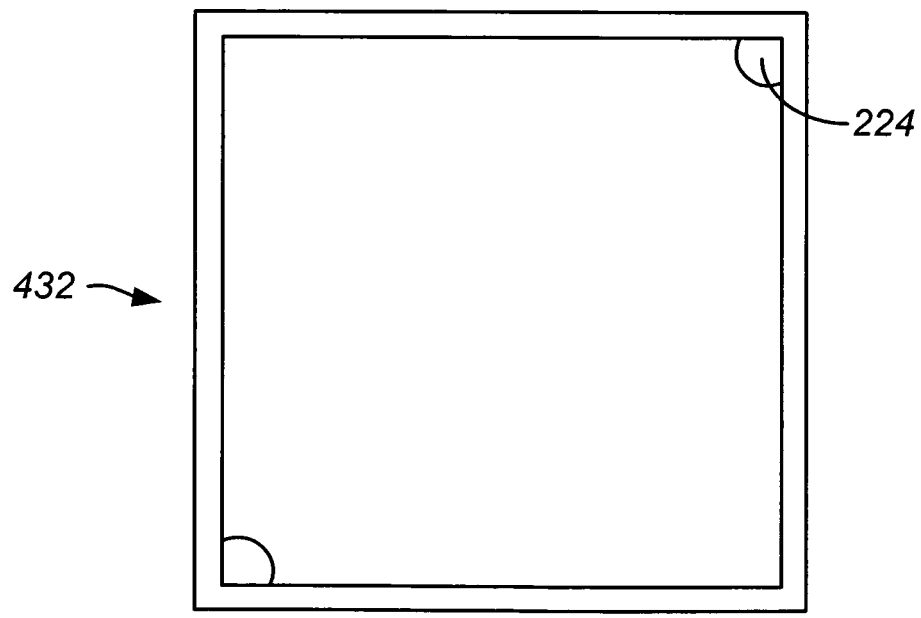

FIG. 4C illustrates the mask pattern 430 used to define the lateral positioning of the vias in a particular embodiment. Referring to FIG. 3D, a first set of vias 242b are provided to make electrical contact with the bias line 110a and a second set of vias 242a are provided to make electrical contact with the bias grid 110b. Of course, the geometry and placement of the vias will depend on the particular applications. FIG. 4D illustrates a mask pattern 432 used in the patterning of AR coatings 224 in an embodiment of the present invention. In addition to covering the mirror posts, the pattern extends around the periphery of the mirror plate fabricated in subsequent steps.

Figure 4E:
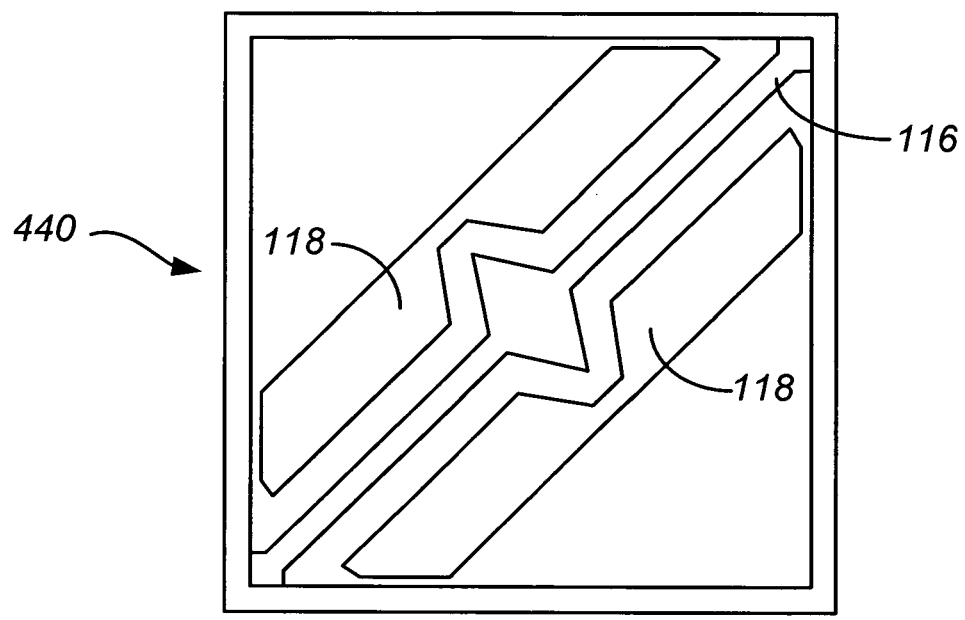
Figure 4F:
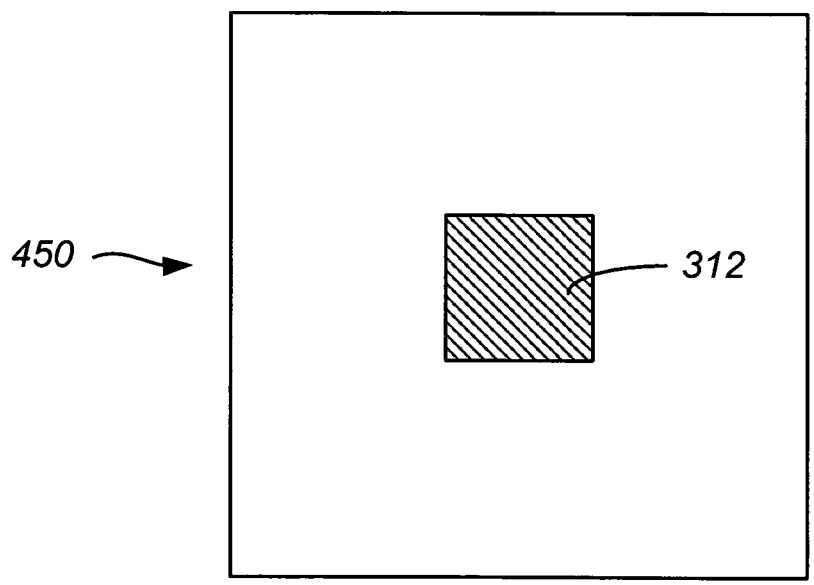

FIG. 4E illustrates a mask pattern 440 used in the definition of the hinge and the patterning of the step electrode in a particular embodiment of the present invention. The single crystal silicon torsion spring hinge 116 and landing structure are laterally separated from the top electrodes 118 during the patterning step discussed in relation to FIG. 3F. As discussed previously, in some embodiments of the present invention, multiple lithography and etching steps are utilized to form the torsion spring hinge structure and the top electrodes 118. FIG. 4F illustrates the mask pattern 450 used to define the mirror post opening 312 discussed with reference to FIG. 3H that provides a deposition interface between the layer 240 including the torsion spring hinge and the mirror post 208.

Figure 5:
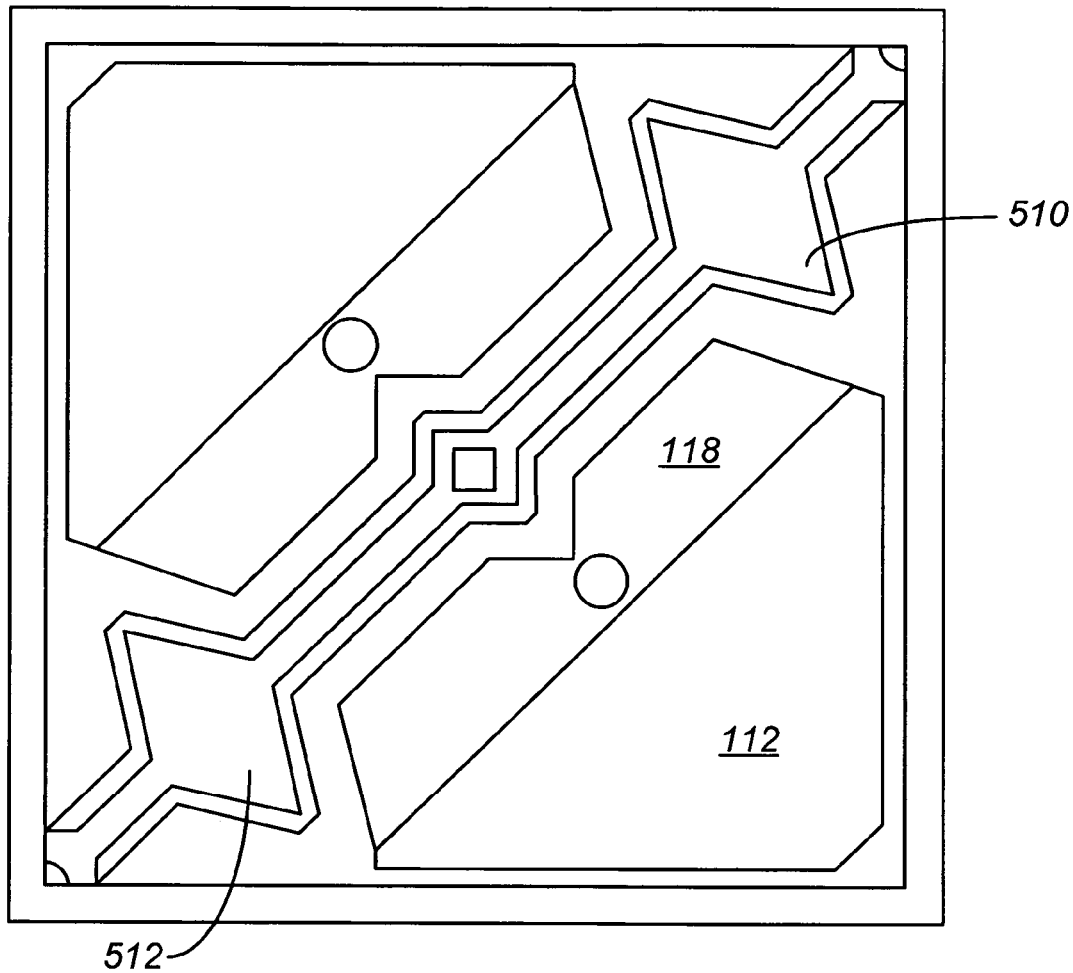
FIG. 5 is a simplified top view illustration of an SLM with dual landing tips according to an embodiment of the present invention.

FIG. 5 is a simplified top view illustration of an SLM with dual landing tips according to an embodiment of the present invention. The bottom electrode layer 112, silicon top electrode 118, and other layers are shown for purposes of illustration. In the embodiment illustrated in FIG. 5, the torsion spring hinge and landing structure include a number of landing tips 510 and 512. In an embodiment, the landing tips are symmetrically placed about a center portion of the mirror. Motion of the mirror to the activated position is arrested as the landing tips make contact with the mirror landing areas provided as part of the bias line. The lateral dimensions of the landing tips are selected as a function of the angle of rotation of the mirror plate and the geometry of the structure. In alternative embodiments, additional landing tips are provided at various positions. One of ordinary skill in the art would recognize many variations, modifications, and alternatives.

Figure 6:
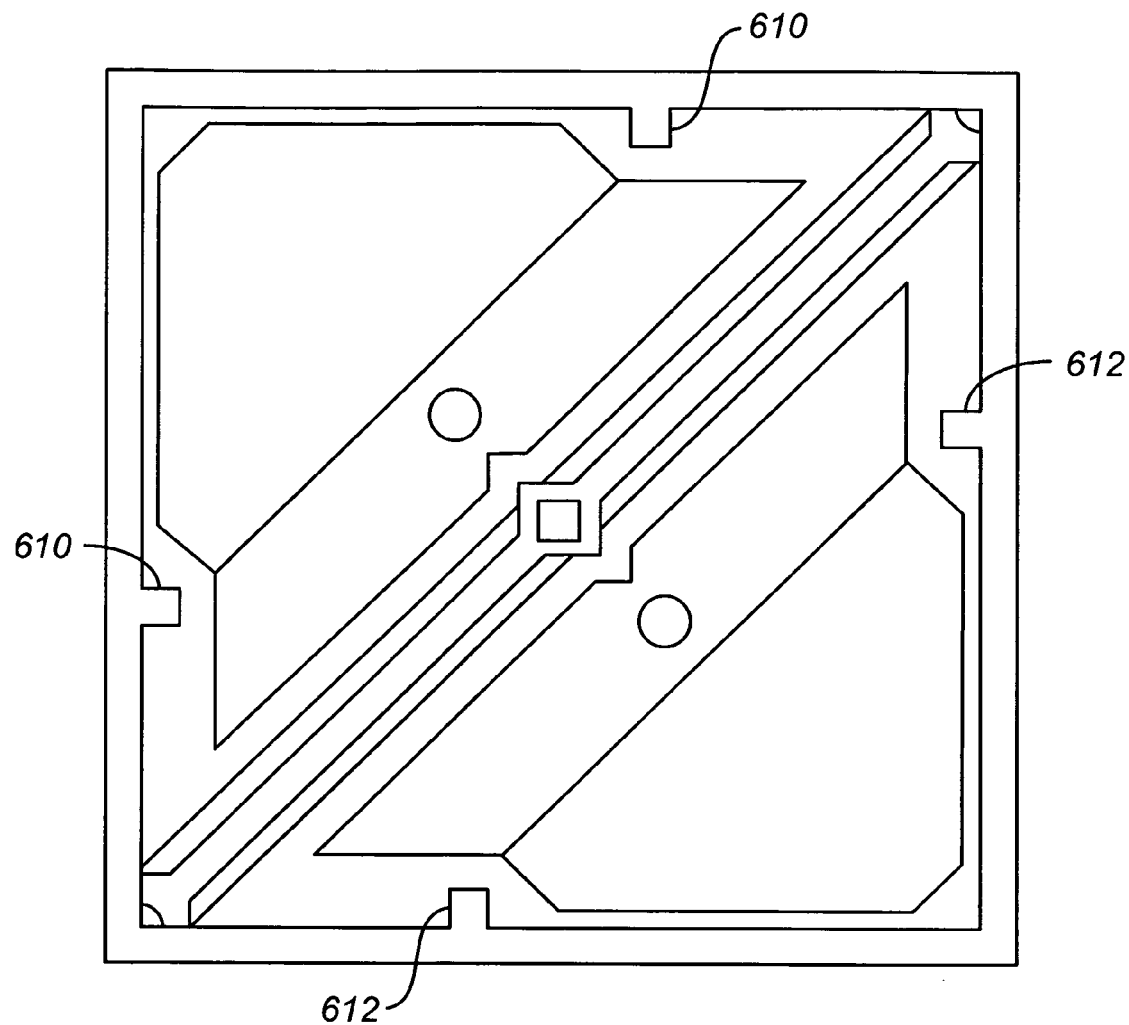
FIG. 6 is a simplified top view illustration of an SLM with landing posts according to an embodiment of the present invention.

FIG. 6 is a simplified top view illustration of an SLM with landing posts according to an embodiment of the present invention. As illustrated in FIG. 6, a pair of landing posts 610 is positioned on one side of the torsion spring hinge and a second pair of landing posts 612 are positioned on another side of the torsion spring hinge. Upon activation of the mirror, the various sets of landing posts arrest the motion of the mirror plate, providing a fixed angular rotation. In an embodiment, the landing posts are formed on the same level as the silicon top electrode. The geometry of the landing posts is a predefined shape, reducing the stiction forces while providing high reliability and longevity.

Figure 7A:
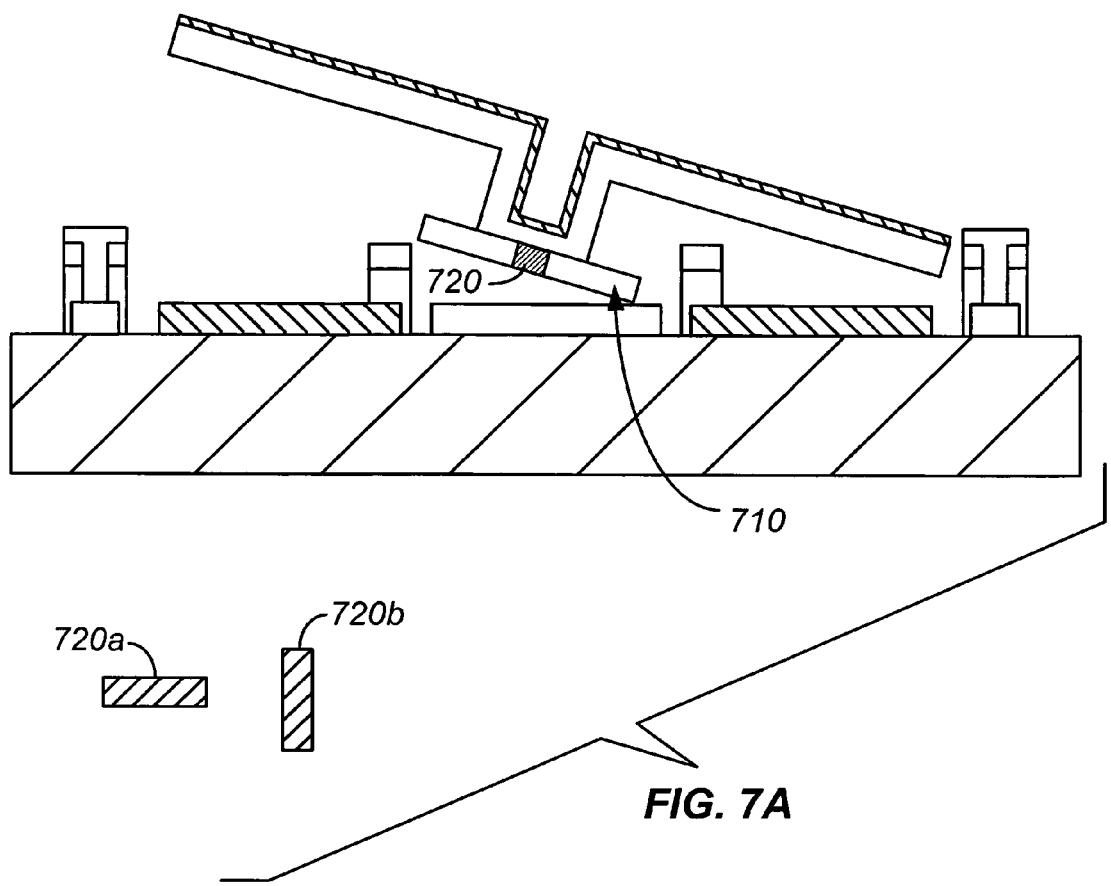
FIG. 7A illustrates a simplified cross-sectional view of an SLM with silicon landing springs according to an embodiment of the present invention.
Figure 7B:
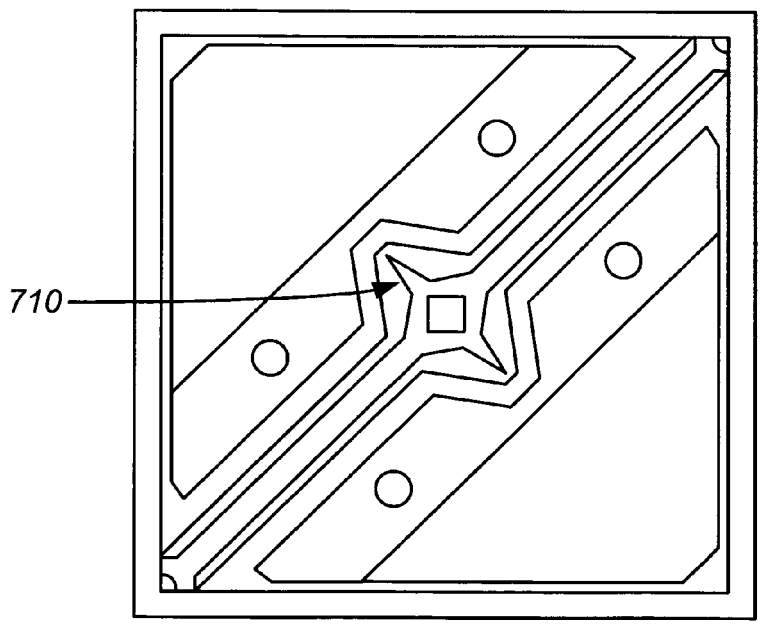
FIG. 7B is a simplified top view illustration of an SLM with silicon landing springs according to an embodiment of the present invention.

FIG. 7A illustrates a simplified cross-sectional view of an SLM with silicon landing springs according to an embodiment of the present invention. The cross-sectional view shown in FIG. 7A illustrates contact between the landing spring 710 and the landing area on the bias line. Referring to the simplified top view illustrated in FIG. 7B, the dimensions of the tip 710 of the landing spring is narrowed to provide a degree of compliance and flexure. As will be evident to one of skill in the art, the flexing of the landing spring will provide for a restoring force to counteract stiction forces present in the landing region. Of course, the particular dimensions of the tip 710 will depend on the particular applications. One of ordinary skill in the art would recognize many variations, modifications, and alternatives.

Also illustrated in FIG. 7A are alternative in torsion spring hinge designs provided by embodiments of the present invention. Variations in hinge design, such as horizontal hinges 720a or vertical hinges 720b with relaxed critical dimension control are provided by embodiments of the present invention. Using a hidden hinge design, the useful shapes and sizes of the hinges are numerous in comparison with conventional hinge designs. Thus, a large design window in which to design the hinge to provide a desired flexibility and rigidity are provided by embodiments of the present invention. Additional discussion of the application to flexible landing spring tips to the reduction of stiction forces is SLMs is provided in U.S. Pat. No. 7,026,695, issued Apr. 1, 2006, commonly assigned and herein incorporated by reference for all purposes.

Figure 8:
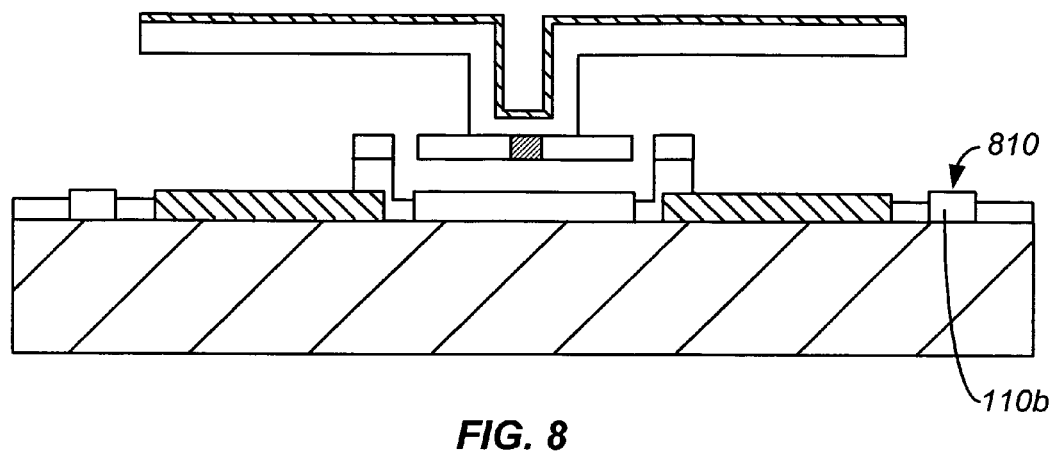
FIG. 8 illustrates an SLM according to a particular embodiment of the present invention.

FIG. 8 illustrates an SLM according to a particular embodiment of the present invention. As discussed previously, AR coatings are optional in some embodiments of the present invention. In the SLM design illustrated in FIG. 8, no AR coatings are provided in regions 810 above the bias grid 110b. The removal of additional structures in comparison with previous designs is also illustrated. According to some embodiments, the removal of these structures reduces the opportunity for mechanical interference and stray reflections that may reduce the system contrast. In yet other embodiments, various structures are removed and AR coatings are formed, for example, on the bias grid 110b. One of ordinary skill in the art would recognize many variations, modifications, and alternatives.

Figure 9:
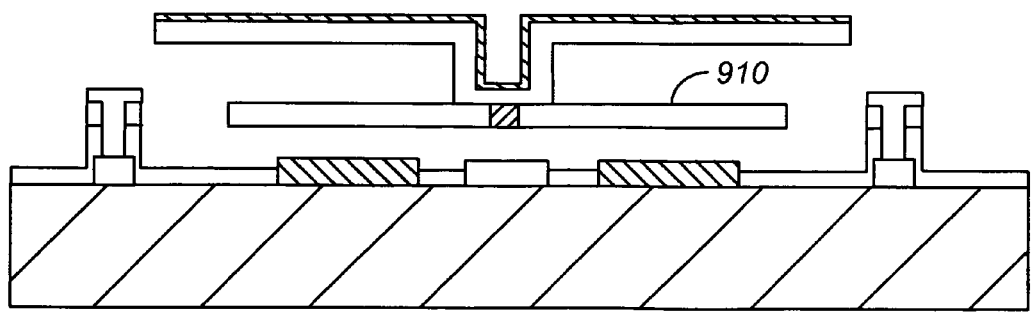
FIG. 9 illustrates a simplified cross-sectional view of an SLM with a silicon mirror plate electrode according to an embodiment of the present invention.

FIG. 9 illustrates a simplified cross-sectional view of an SLM with a silicon mirror plate electrode according to an embodiment of the present invention. As illustrated in FIG. 9, the single crystal silicon layer 910 is used as both a landing structure and an electrode. The landing structure defined by the outer portions of layer 910 makes contact with the bias line according to embodiments of the present invention. The use of layer 910 as the electrode enables designs in which the mirror plate is not conductive. In some embodiments, the design illustrated in FIG. 9 will reduce the operating voltages of the SLM by decreasing the distance from the bias line to the electrode.

Figure 10A:
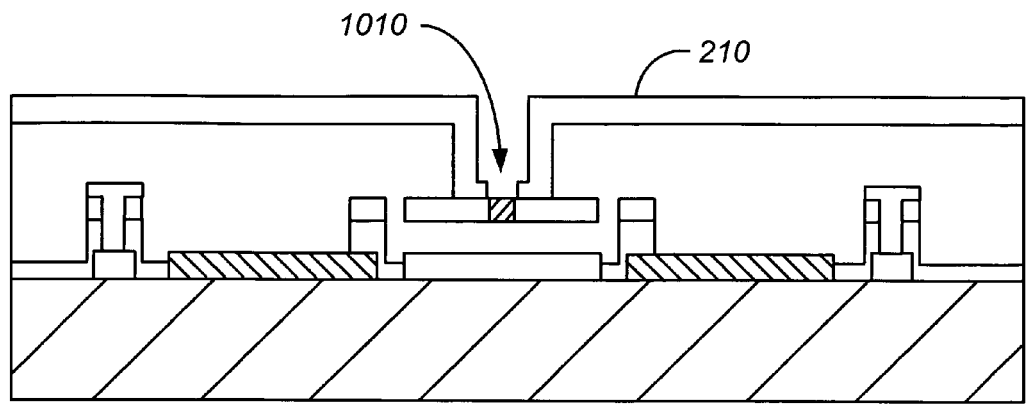
FIGS. 10A-10D illustrate simplified cross-sectional views of a process flow for fabricating an SLM with an electrical contact according to an alternative embodiment of the present invention.

FIGS. 10A-10D illustrate simplified cross-sectional views of a process flow for fabricating an SLM with an electrical contact according to an alternative embodiment of the present invention. As illustrated in FIG. 10A, a portion 1010 of the amorphous silicon layer 210 is removed. In an embodiment, the amorphous silicon layer is masked and etched using a silicon etch process to expose the single crystal silicon hinge, which is a conductive layer. As described more fully below, opening 1010 provides a path for electrical conduction between the single crystal silicon hinge and layers subsequently deposited.

Figure 10B:
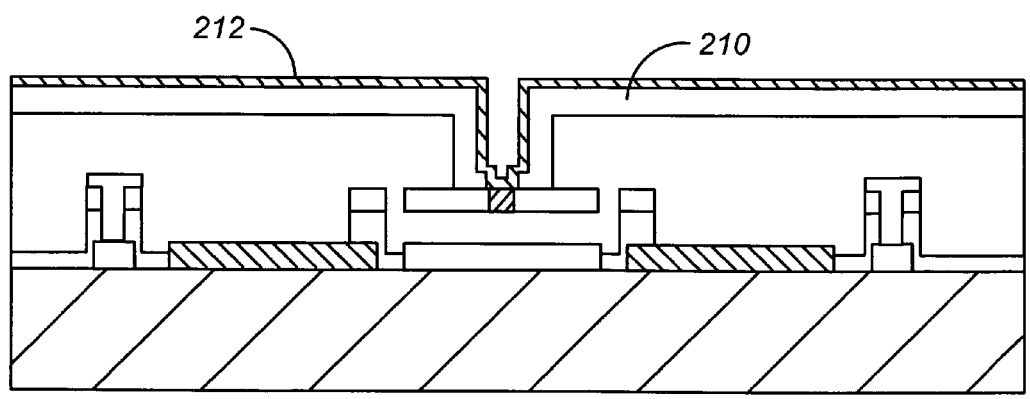
Figure 10C:
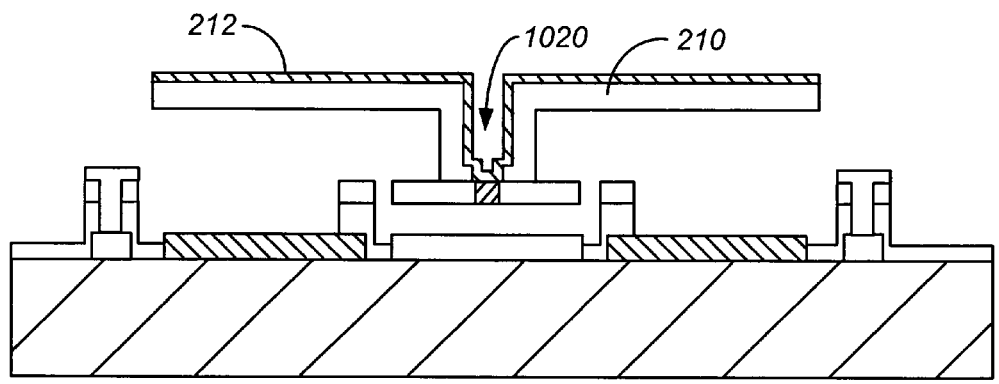

FIG. 10B illustrates the formation of a reflective and conductive layer according to an embodiment of the present invention. As illustrated, the deposition of a composite titanium seed layer and an aluminum reflective layer 212 on portions of the mirror post and the mirror plate is performed. As will be evident to one of skill in the art, electrical contact at the interface between the single crystal silicon hinge and the composite Ti/Al layer (or TiN/Ti layers) is provided at a central portion of the hinge. In some embodiments, metal PVD processes similar to those previously described are utilized to form a conformal layer 212 as illustrated in FIG. 10B. FIG. 10C illustrates a mirror release process according to an embodiment of the present invention. As illustrated in FIG. 10C, the amorphous silicon mirror layer 210 and the reflective/conductive layer 212 are patterned and etched to form the illustrated mirror structure. As illustrated by reference number 1020, electrical contact between the single crystal silicon hinge and the reflective/conductive layer is provided. In a manner similar to that discussed previously, sacrificial material illustrated in FIGS. 10A and 10B is removed during the mirror release process.

Figure 10D:
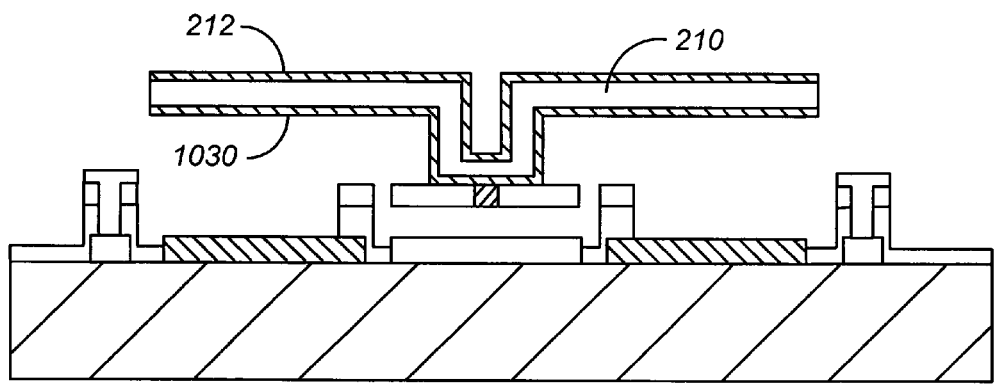

In the alternative embodiment illustrated by FIG. 10D, electrically conductive and reflective layer 1030 is formed prior to deposition of the amorphous silicon layer 210. Referring to FIGS. 3H and 3I, the PVD formation of layer 1030 may be performed after the opening of aperture 312 and prior to the deposition of amorphous silicon layer 210, thereby inserting a metal deposition process in the process flow. In some embodiments, a composite Ti/Al metal layer is formed as discussed above. Amorphous silicon layer 210 is formed as discussed above, as well as a top metal layer 212. Electrical contact is provided by the contact between the single crystal silicon hinge and layer 1030. Thus, both electrical conductivity and optical reflection functions are performed by layers 1030 and 212. As will be evident to one of skill in the art, many of the previous processing steps may be utilized to fabricate the structure illustrated in FIG. 10D, including a mirror release process. In the embodiment illustrated in FIG. 10D, the bottom metal layer 1030 serves as a mirror electrode, reducing the operating voltages and providing other benefits.

Figure 11:
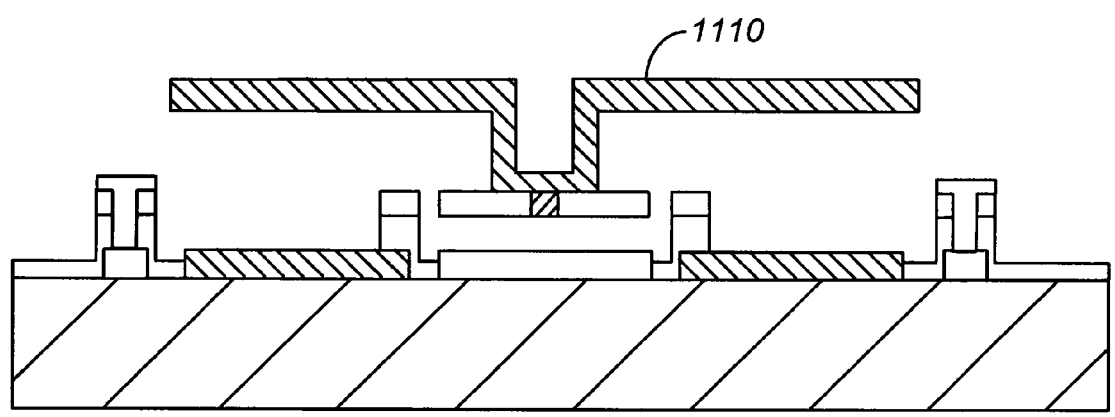
FIG. 11 illustrates a simplified cross section view of a silicon/Al alloy mirror according to an embodiment of the present invention.

FIG. 11 illustrates a simplified cross section view of a silicon/Al alloy mirror according to an embodiment of the present invention. As illustrated in FIG. 11, the amorphous silicon mirror layer is replaced by a silicon/Al alloy layer 1110 that is both conductive and reflective. Referring to FIGS. 3I and 3J, the silicon/Al alloy mirror layer 1110 is fabricated in place of the layers illustrated in those figures. As will be evident to one of skill in the art, many of the previous processing steps may be utilized to fabricate the structure illustrated in FIG. 11, including a mirror release process.

Figure 12A:
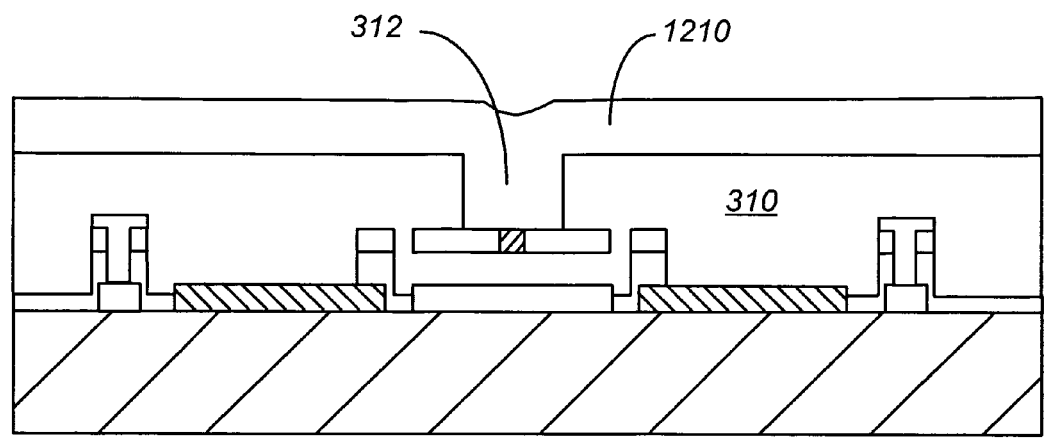
FIGS. 12A-12D illustrate simplified cross-sectional views of a process flow for fabricating an SLM with a flat amorphous silicon mirror according to an embodiment of the present invention.

FIGS. 12A-12D illustrate simplified cross-sectional views of a process flow for fabricating an SLM with a flat amorphous silicon mirror according to an embodiment of the present invention. Merely by way of example, the processes shown in FIGS. 12A-12B may be used to perform a variant of the process illustrated in FIG. 3I. As illustrated in FIG. 12A, an amorphous silicon layer 1210 is deposited on the sacrificial material 310 formed in a previous processing step (e.g., the process illustrated in FIG. 3H). In an embodiment, a PVD process is used to form an amorphous silicon layer of sufficient thickness to fill region 312 above the torsion spring hinge. Depending on the deposition conditions, non-planar features may be present in the upper surface of layer 1210.

Figure 12B:
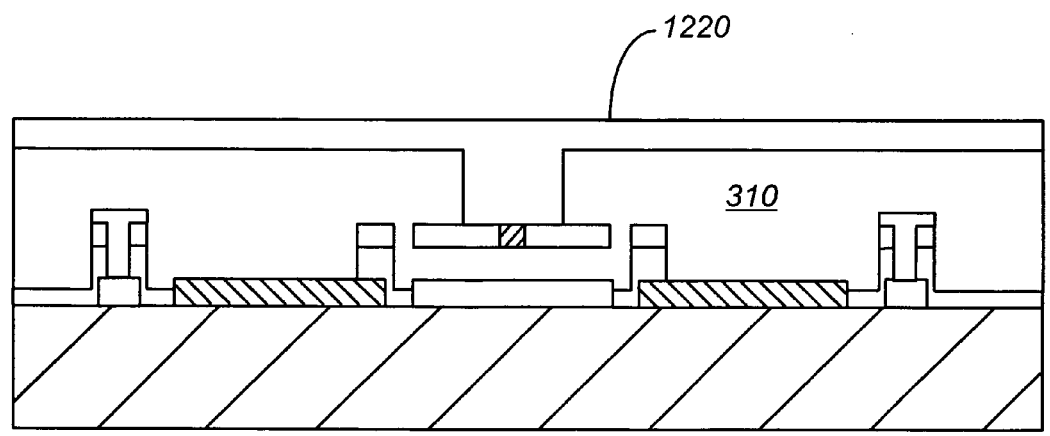
Figure 12C:
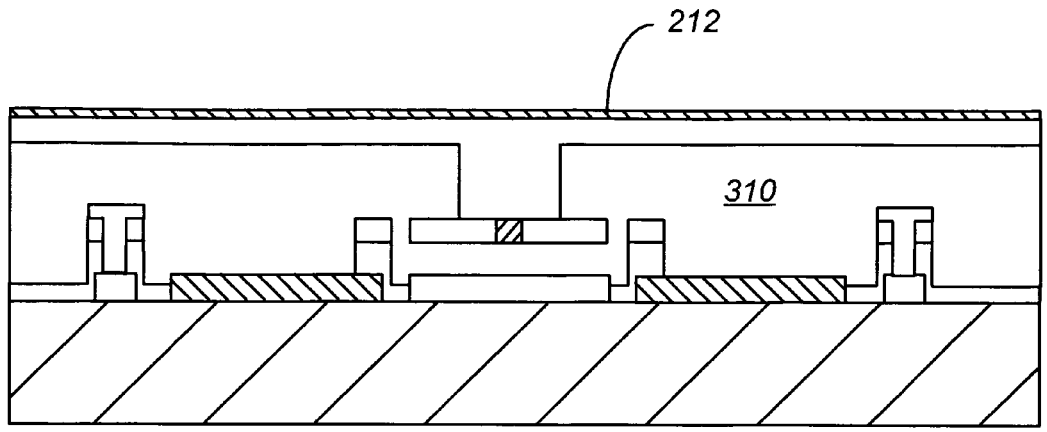
Figure 12D:
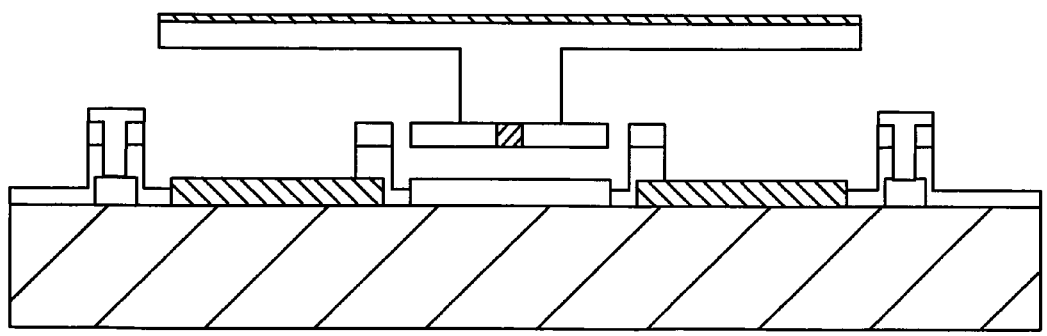

In FIG. 12B, a planarization process is illustrated to form flat surface 1220. According to embodiments of the present invention, polishing or CMP processes are utilized to planarize the amorphous silicon layer previously deposited. The formation of a composite reflective layer 212, for example Ti/Al, is illustrated in FIG. 12C and a mirror release process is illustrated in FIG. 12D. Utilizing embodiments the present invention such as the one illustrated in FIG. 12D, SLMs characterized by high optical quality are provided. The flat upper surface of the mirror, for the example, in comparison to the mirror shown in FIG. 3L, provides for high fill ratio and reduced scattering among other optical qualities. One of ordinary skill in the art will recognize the benefits provided by such a design.

Figure 13A:
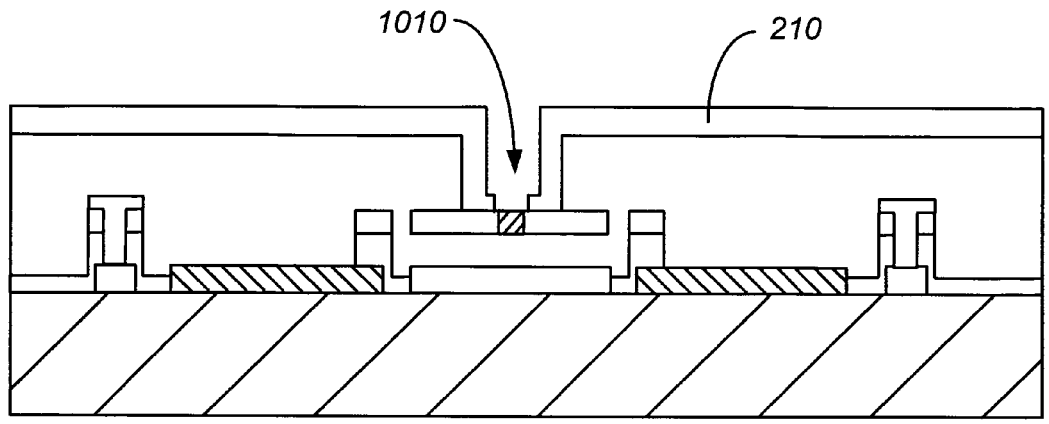
FIGS. 13A-13E illustrate simplified cross-sectional views of a process flow for fabricating an SLM with a flat composite mirror according to an embodiment of the present invention.
Figure 13B:
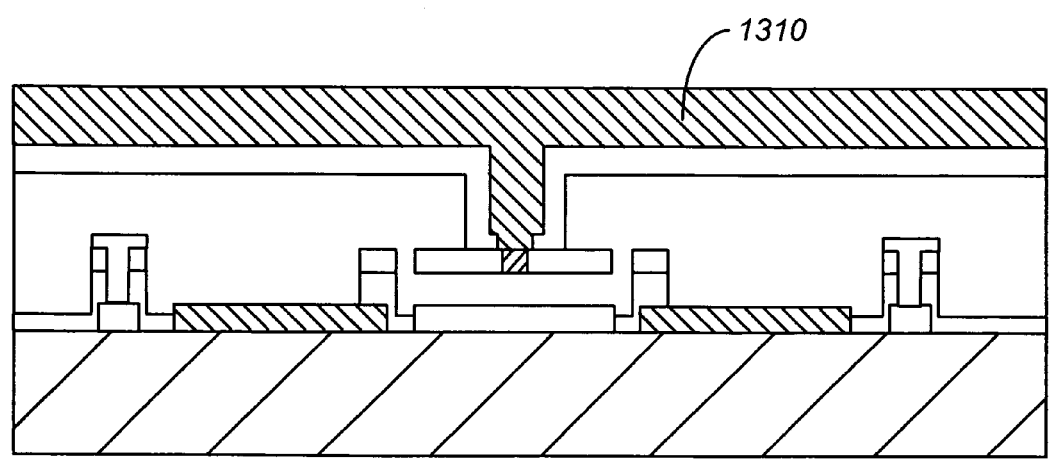

FIGS. 13A-13E illustrate simplified cross-sectional views of a process flow for fabricating an SLM with a flat composite mirror according to an embodiment of the present invention. As illustrated in FIG. 13A, an opening 1010 is formed in the amorphous silicon layer 210 to provide electrical contact between the hinge and subsequently deposited layers. A tungsten deposition process is illustrated in FIG. 13B, filling the gap above the hinge and providing electrical contact between the tungsten layer 1310 and the hinge through opening 1010 as previously illustrated and discussed. Although the upper surface of tungsten layer 1310 is illustrated as planar, this is not required by the present invention. As discussed below, planarization processes are utilized in some embodiments to planarize tungsten layer 1310.

Figure 13C:
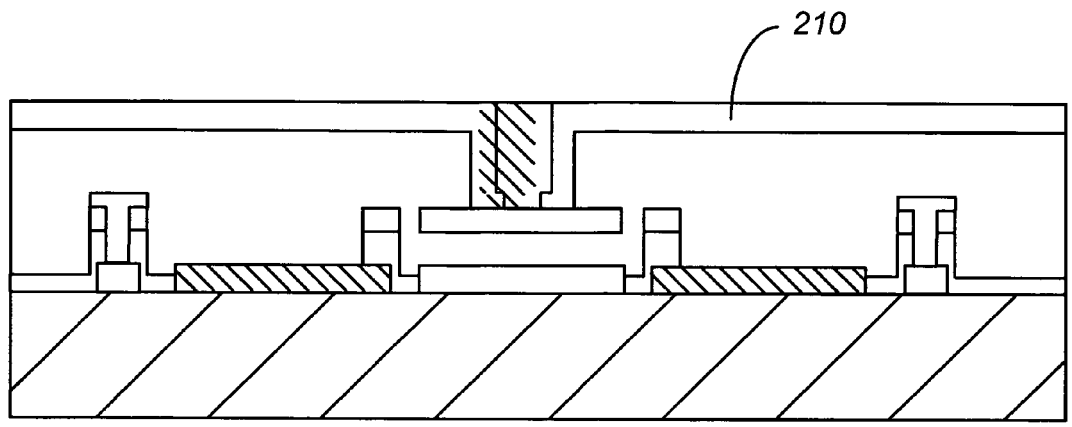
Figure 13D:
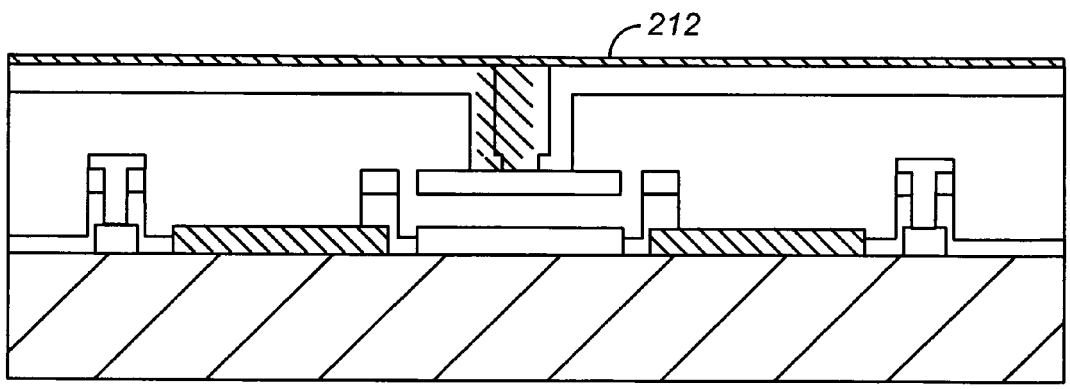
Figure 13E:
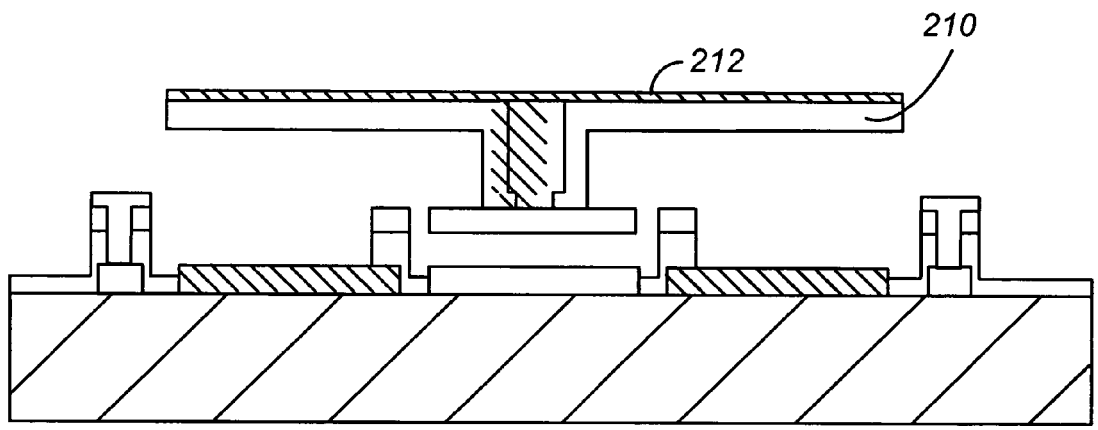

FIG. 13C illustrates a tungsten CMP/etchback process that reduces the tungsten thickness to a level aligned with an upper surface of the amorphous silicon layer 210. As will be evident to one of skill in the art, tungsten deposition and planarization processes are widely used in via plug applications. Some embodiments of the present invention utilize these processes. The formation of a composite reflective layer 212, for example Ti/Al, is illustrated in FIG. 13D and a mirror release process is illustrated in FIG. 13E. Utilizing embodiments the present invention such as the one illustrated in FIG. 13E, SLMs characterized by high optical quality are provided, similar to those discussed in relation to FIGS. 12A-12D. The flat surface of the mirror provides for high fill ratio among other optical qualities. Additionally, electrical contact between a reflective layer and the hinge is provided via the tungsten plug filling opening 1010. One of ordinary skill in the art will recognize the benefits provided by such a design.

Figure 14A:
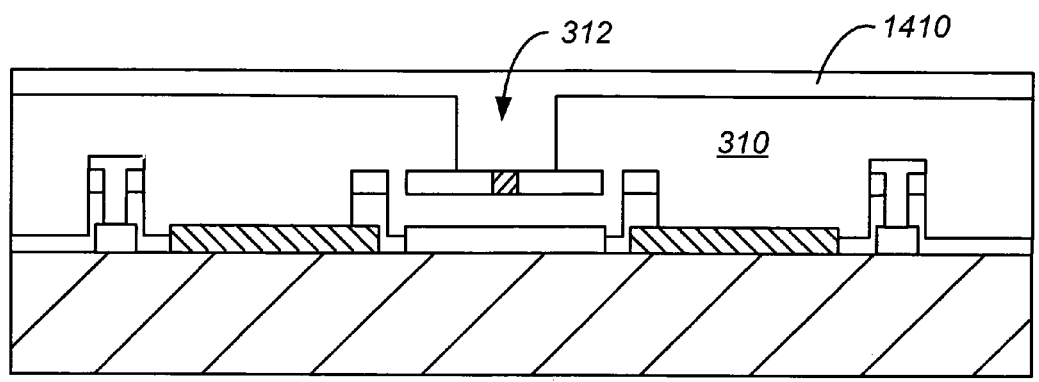
FIGS. 14A-14B illustrate simplified cross-sectional views of a process flow for fabricating an SLM with a low temperature spin on glass (SOG) mirror according to an embodiment of the present invention.
Figure 14B:
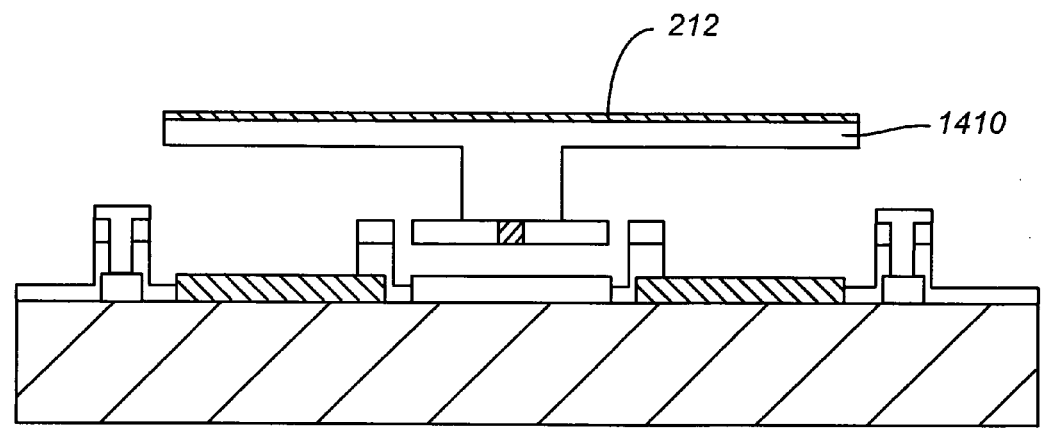

FIGS. 14A-14B illustrate simplified cross-sectional views of a process flow for fabricating an SLM with a low temperature spin on glass (SOG) mirror according to an embodiment of the present invention. As illustrated in FIG. 14A, a low temperature SOG layer 1410 is formed, filling the gap 312 between sacrificial material 310 that is formed as previously described. The formation of a reflective layer 212 on top of the low temperature SOG layer 1410 as well as a mirror release process is illustrated in FIG. 14B. Utilizing SOG processes, embodiments of the present invention fill the gap 312 and form a flat mirror surface in a reduced number of processing steps. In general, bias and other electrical contacts are formed as previously described.

Figure 15:
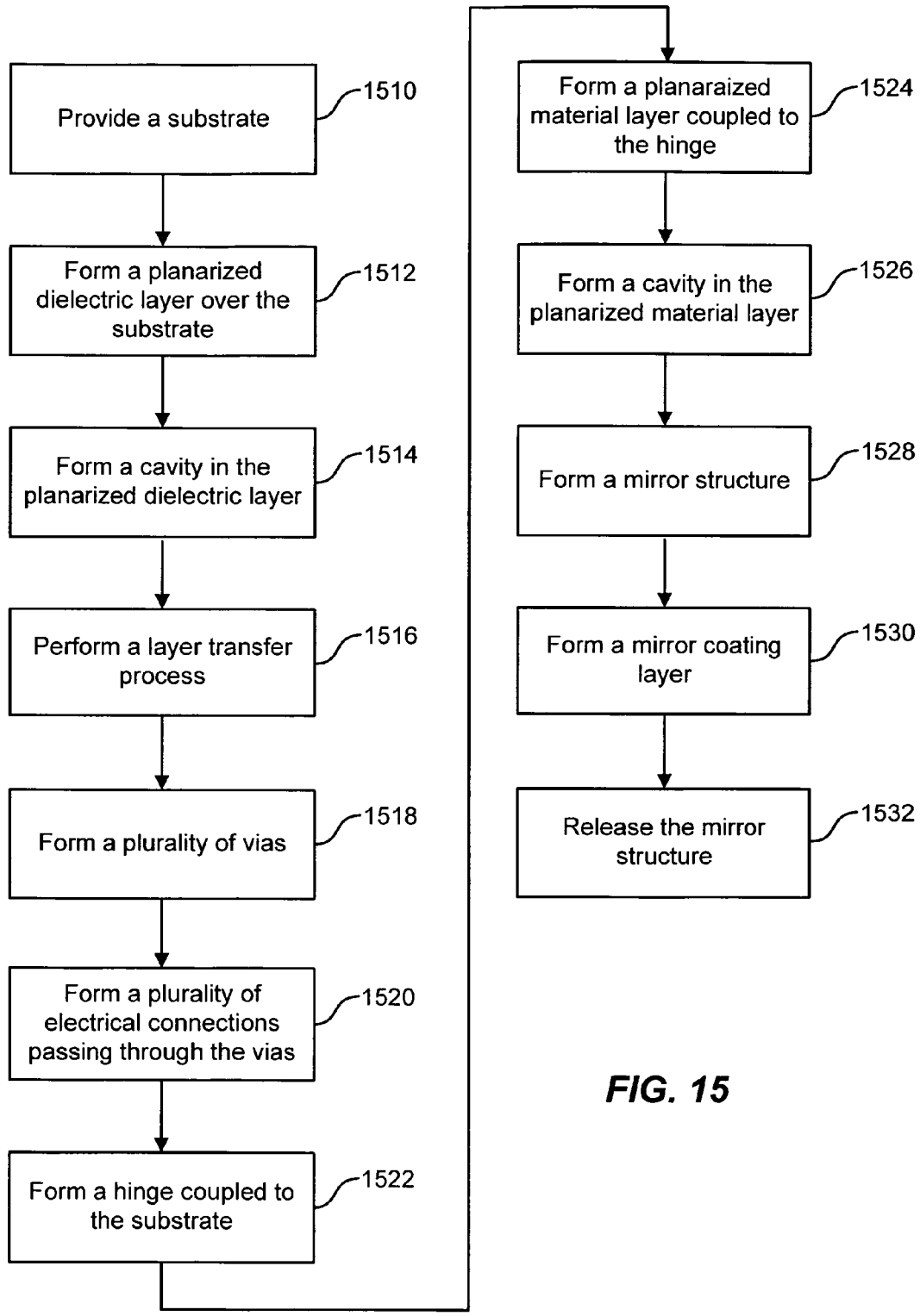
FIG. 15 is a simplified flowchart illustrating a process of fabricating an optical deflection device according to an embodiment of the present invention.

FIG. 15 is a simplified flowchart illustrating a process of fabricating an optical deflection device according to an embodiment of the present invention. The method includes providing a substrate (1510) and forming a planarized dielectric layer over the substrate (1512). In an embodiment, the substrate includes a number of electrodes and associated electrode drivers. Merely by way of example, the substrate is a CMOS substrate with integrated electrodes, memory buffer, video display controller for processing video signals, and a pulse width modulation array. Other components suitable for controlling an array of micro-mirrors as deflection devices are provided by other embodiments. One of ordinary skill in the art would recognize many variations, modifications, and alternatives.

In a particular embodiment, forming a planarized dielectric layer includes depositing an oxide layer using an HDP process and planarizing the deposited oxide layer using a CMP process. The formation and planarization of the oxide layer are performed at temperatures that will not damage the CMOS substrate, for example, by melting aluminum contacts. Low temperature processes are thus utilized in processing steps discussed herein.

The method also includes forming a cavity in the planarized dielectric layer (1514), performing a layer transfer process to bond a single crystal silicon layer to the planarized dielectric layer (1516), forming a plurality of vias passing through the single crystal silicon layer and the planarized dielectric layer (1518), and forming a plurality of electrical connections passing through the plurality of vias (1520). In a specific embodiment, the plurality of vias includes a first set of vias providing an electrical conduction path to a bias line and a second set of vias providing an electrical conduction path to a bias grid. Thus, multiple separate electrical conduction paths are provided by the vias. The plurality of electrical connections include either via plugs or a conformal metal layer that is deposited on the single crystal silicon layer and in the vias. Merely by way of example, the conformal metal layer may be a composite Ti/Al layer that provides for via step coverage and electrical connectivity between the bias level and the single crystal silicon layer.

The method further includes forming a hinge coupled to the substrate (1522), forming a planarized material layer coupled to the hinge (1524), and forming a cavity in the planarized material layer (1526). In a specific embodiment, the method includes forming an upper electrode by patterning and removing a portion of the single crystal silicon layer. The formation of the hinge and the upper electrodes may be performed concurrently or in two separate processing steps. In an embodiment in which two processing steps are utilized, different lithography processes characterized by different critical dimension values may be utilized, for example, defining the hinge with a higher resolution lithography process than the resolution used for defining the upper electrode. The planarized material layer comprises photoresist in some embodiments, which embeds the underlying layers and removed during subsequent processing steps using well-known photoresist removal processes and tools.

The method additionally includes forming a mirror structure including a silicon material (1528), forming a mirror coating layer (1530), and releasing the mirror structure (1532). The formation of the mirror structure may include depositing and planarizing an amorphous silicon mirror layer using processes performed at a temperature of less than 150° C. In a particular embodiment, the mirror coating layer includes a composite Ti/Al layer and the silicon mirror layer is released using an $O_2$ plasma ashing process.

The above sequence of steps provides a method for fabricating an optical deflection device such as an SLM according to an embodiment of the present invention. As shown, the method uses a combination of steps including a way of forming movable micro-mirror structures. Other alternatives can also be provided where steps are added, one or more steps are removed, or one or more steps are provided in a different sequence without departing from the scope of the claims herein. Further details of the present method can be found throughout the present specification.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of forming a composite substrate structure, the method comprising:
   providing a substrate comprising a plurality of electrode devices and a bias grid;
   forming a planarized dielectric layer over the substrate, the planarized dielectric layer defining an upper surface opposing the substrate;
   forming a cavity extending from the upper surface of the planarized dielectric layer to a predetermined depth, wherein a cavity volume is defined by a cavity area parallel to the upper surface of the planarized dielectric layer and the predetermined depth;
   joining a single crystal silicon layer to the upper surface of the planarized dielectric layer to define a bonded area greater than the cavity area.

2. The method of claim 1 wherein the bonded area is two times greater than the cavity area.

3. The method of claim 2 wherein the bonded area is ten times greater than the cavity area.

4. The method of claim 3 wherein the bonded area is 90 times greater than the cavity area.

5. The method of claim 4 wherein the bonded area is characterized by a bonded area to a total area of greater than 10%.

6. The method of claim 1 wherein the plurality of electrode devices comprise a plurality of multi-level electrode devices.

7. The method of claim 6 wherein a portion of a first level of the plurality of multi-level electrode devices is covered by the planarized dielectric layer and a portion of a second level of the plurality of multi-level electrode devices is formed from the single crystal silicon layer.

8. The method of claim 1 wherein the planarized dielectric layer comprises an HDP silicon oxide layer.

9. The method of claim 8 wherein the HDP silicon oxide layer is formed at a temperature of less than 200 °C.

10. The method of claim 9 wherein the HDP silicon oxide layer is formed at a temperature of less than 150 °C.

11. The method of claim 1 wherein the planarized dielectric layer is fabricated from a material selected from the group consisting of silicon oxide, silicon nitride, silicon oxynitride, poly-silicon, amorphous silicon, and low temperature poly-silicon.

12. The method of claim 1 wherein forming a planarized dielectric layer comprises a CMP process.

13. The method of claim 1 wherein joining a single crystal silicon layer to the upper surface of the planarized dielectric layer comprises performing a substrate bonding process.

14. The method of claim 13 wherein the substrate bonding process comprises a silicon-on-insulator substrate bonding process.

15. The method of claim 13 wherein the substrate bonding process is performed at a temperature less than an aluminum reflow temperature.

16. The method of claim 1 wherein joining a single crystal silicon layer to the upper surface of the planarized dielectric layer comprises:
   substrate bonding an SOI substrate to planarized dielectric layer;
   removing a first silicon layer; and
   removing a buried oxide layer to expose the single crystal silicon layer.

17. The method of claim 1 wherein joining a single crystal silicon layer to the upper surface of the planarized dielectric layer is performed using an alignment process with a tolerance requirement of less than 1 cm.

18. The method of claim 17 wherein joining a single crystal silicon layer to the upper surface of the planarized dielectric layer comprises forming a covalent bond at room temperature.

19. The method of claim 18 wherein joining a single crystal silicon layer to the upper surface of the planarized dielectric layer comprises a plasma activation process and a room temperature covalent bonding process.

20. The method of claim 1 further comprising:
   forming a plurality of vias passing through the single crystal silicon layer and the planarized dielectric layer to the bias grid; and
   forming a plurality of via plugs, each of the plurality of via plugs passing through one of the plurality of vias.

21. The method of claim 20 wherein the plurality of via plugs provide electrical connectivity to the bias grid.

22. The method of claim 1 further comprising:
   forming a second plurality of vias, each of the second plurality of vias passing through the single crystal silicon layer and the planarized dielectric layer to one of the plurality of electrode devices; and
   forming a second plurality of via plugs, each of the second plurality of via plugs passing through one of the second plurality of vias.

23. The method of claim 22 wherein the second plurality of via plugs provide electrical connectivity to the plurality of electrode devices.

* * * * *